(12) United States Patent
Yashiro et al.

(10) Patent No.: US 12,221,103 B2
(45) Date of Patent: Feb. 11, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Katsuya Yashiro, Wako (JP); Hiroshi Oguro, Wako (JP); Chihiro Oguro, Wako (JP); Junya Yoda, Wako (JP); Keisuke Hata, Wako (JP); Tomofumi Koishi, Wako (JP); Shingo Ito, Wako (JP); Ayumu Horiba, Wako (JP); Tadahiko Kanoh, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 181 days.

(21) Appl. No.: 17/555,541

(22) Filed: Dec. 20, 2021

(65) Prior Publication Data
US 2022/0203985 A1    Jun. 30, 2022

(30) Foreign Application Priority Data

Dec. 28, 2020   (JP) ................................ 2020-218167

(51) Int. Cl.
*B60W 30/165*   (2020.01)
*B60W 30/18*    (2012.01)

(52) U.S. Cl.
CPC .... *B60W 30/165* (2013.01); *B60W 30/18109* (2013.01); *B60W 2300/36* (2013.01); *B60W 2420/408* (2024.01); *B60W 2552/53* (2020.02)

(58) Field of Classification Search
CPC ......... B60W 30/165; B60W 30/18109; B60W 252/53; B60W 2300/36; B60W 2420/52
See application file for complete search history.

(56) References Cited

U.S. PATENT DOCUMENTS

2012/0306664 A1* 12/2012 Geter ..................... G08G 1/166
                                                  340/903
2015/0046038 A1*  2/2015 Kawamata ......... G08G 1/09623
                                                   701/41

(Continued)

FOREIGN PATENT DOCUMENTS

JP    2011-118603      6/2011
JP    2018-189594     11/2018

(Continued)

OTHER PUBLICATIONS

Japanese Office Action for Japanese Patent Application No. 2020-218167 mailed Jul. 5, 2022.

*Primary Examiner* — Dale W Hilgendorf
*Assistant Examiner* — Hana Lee
(74) *Attorney, Agent, or Firm* — Amin, Turocy & Watson, LLP

(57) ABSTRACT

A vehicle control device of the embodiment includes a recognizer that recognizes a surrounding situation of a host vehicle; and a driving controller that controls one or both of steering or acceleration/deceleration of the host vehicle to cause the host vehicle to travel, wherein the driving controller causes the host vehicle to travel in any of a plurality of driving modes including a first driving mode in which the host vehicle travels so that the speed of the host vehicle reaches a target speed, and the driving controller restricts the execution of at least the first driving mode when a specific object is recognized in a traveling direction of the host vehicle based on map information or a recognition result from the recognizer during the execution of the first driving mode.

8 Claims, 12 Drawing Sheets

(56) References Cited

U.S. PATENT DOCUMENTS

| | | | | |
|---|---|---|---|---|
| 2018/0118223 A1* | 5/2018 | Mori | ................... | G08G 1/167 |
| 2018/0335781 A1* | 11/2018 | Chase | ................... | G08G 1/0133 |
| 2019/0202473 A1* | 7/2019 | Kaji | ................... | B60W 50/12 |
| 2019/0286149 A1* | 9/2019 | Miura | ................... | B60W 60/001 |
| 2019/0315355 A1* | 10/2019 | Tokimasa | ................ | B60W 30/14 |
| 2020/0180618 A1* | 6/2020 | Ohmura | ............... | B60W 50/12 |
| 2020/0202713 A1* | 6/2020 | Gesch | ................... | G05D 1/0231 |
| 2020/0223438 A1* | 7/2020 | Masui | ................... | B60K 31/0008 |
| 2020/0307581 A1* | 10/2020 | Shimbo | ................ | B60W 30/09 |
| 2020/0307641 A1* | 10/2020 | Oyama | ................ | B60W 40/08 |
| 2022/0234607 A1* | 7/2022 | Hata | ................... | B60W 60/001 |

FOREIGN PATENT DOCUMENTS

| | | |
|---|---|---|
| JP | 2019-001314 | 1/2019 |
| JP | 2019-093879 | 6/2019 |

\* cited by examiner

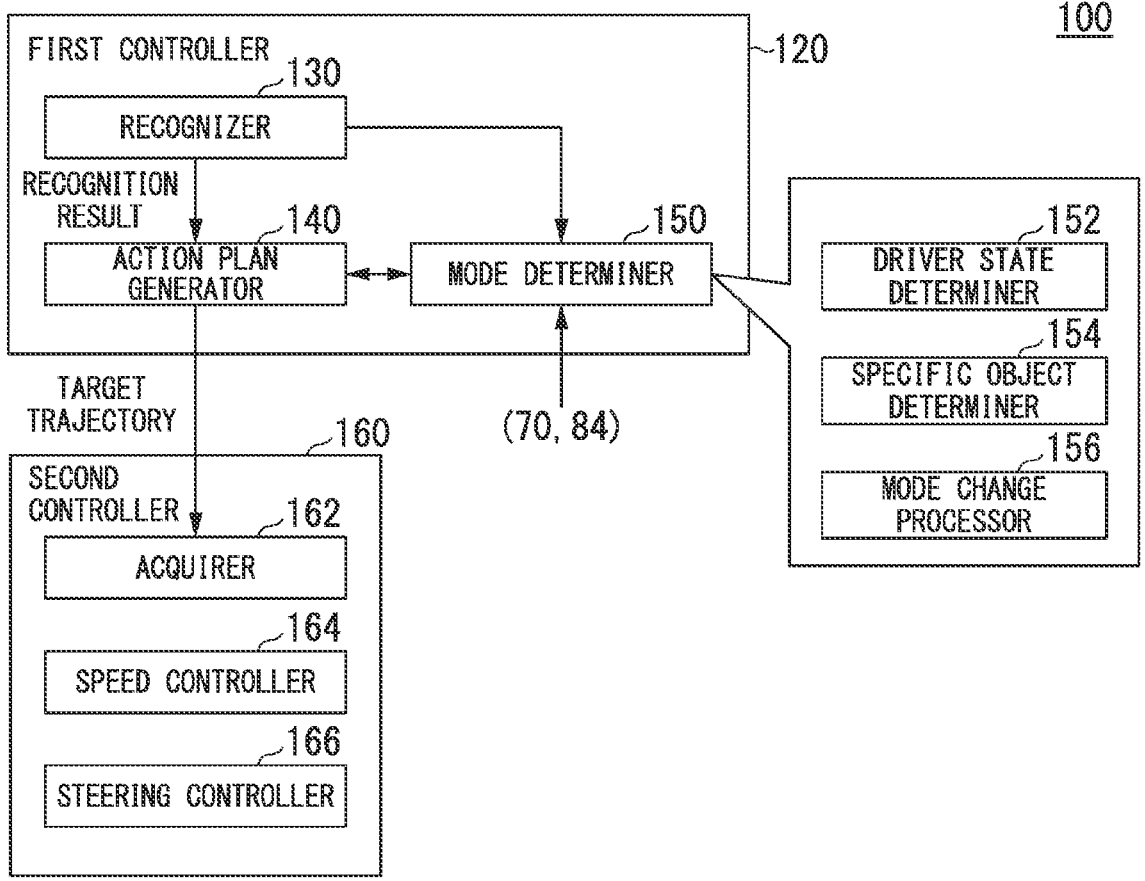

VEHICLE CONTROL DEVICE, VEHICLE CONTROL METHOD, AND STORAGE MEDIUM

CROSS-REFERENCE TO RELATED APPLICATION

This application claims priority to and the benefit from Japanese Patent Application No. 2020-218167, filed on Dec. 28, 2020, the contents of which are hereby incorporated by reference into the present application.

BACKGROUND

Field of the Invention

The present invention relates to a vehicle control device, a vehicle control method, and a storage medium.

Description of Related Art

In recent years, research on automated driving in which traveling of a vehicle is controlled automatically has progressed. In this context, a technology that determines whether automated driving is allowed by examining the presence of high-precision map information required for performing automated driving with respect to a road on which a host vehicle has traveled and notifies of information acquired based on the determination result is known (for example, see Japanese Patent Application Publication No. 2018-189594).

SUMMARY

However, in the conventional technology, it is not guaranteed that the map will match the condition of the road on which the vehicle travels even when the high-precision map is used. Therefore, it may not be possible to execute appropriate vehicle driving control according to the surrounding situation.

Aspects of the present invention are made in view of such circumstances, and one of the objects thereof is to provide a vehicle control device, a vehicle control method, and a storage medium capable of performing more appropriate vehicle control according to a surrounding situation.

A vehicle control device, a vehicle control method, and a storage medium according to the present invention employ the following configurations.

(1) A vehicle control device according to an aspect of the present invention is a vehicle control device including: a recognizer that recognizes a surrounding situation of a host vehicle; and a driving controller that controls one or both of steering or acceleration/deceleration of the host vehicle to cause the host vehicle to travel, wherein the driving controller causes the host vehicle to travel in any of a plurality of driving modes including a first driving mode in which the host vehicle travels so that the speed of the host vehicle reaches a target speed, and the driving controller restricts the execution of at least the first driving mode when a specific object is recognized in a traveling direction of the host vehicle based on map information or a recognition result from the recognizer during the execution of the first driving mode.

(2) In aspect (1), the specific object includes a traffic light within a predetermined distance from the host vehicle on a road on which the host vehicle travels.

(3) In aspect (1), the specific object includes a tunnel within a predetermined distance from the host vehicle.

(4) In aspect (1), the first driving mode is a mode in which the host vehicle travels following a preceding vehicle, and the driving controller restricts the execution of at least the first driving mode when the preceding vehicle is no longer present in front of the host vehicle during the execution of the first driving mode, and when a distance from the host vehicle to a vehicle traveling ahead of the preceding vehicle is equal to or greater than a predetermined distance, or when there is no vehicle in front of the preceding vehicle is not present.

(5) In aspect (1), the specific object includes a two-wheeled vehicle, and the driving controller restricts the execution of at least the first driving mode when the preceding vehicle of the host vehicle is a two-wheeled vehicle and the two-wheeled vehicle is continuously recognized for a predetermined time or longer.

(6) In aspect (1), the driving controller restricts the execution of at least the first driving mode when the recognizer recognizes a road shoulder of a lane in which the host vehicle travels during the execution of the first driving mode and another vehicle is recognized on the road shoulder.

(7) In aspect (1), the specific object is a specific vehicle or a specific obstacle, and the driving controller restricts the execution of at least the first driving mode when the first driving mode is being executed and the specific vehicle or the specific obstacle is recognized in front of the host vehicle.

(8) In aspect (1), the driving controller releases the restriction of the execution of the first driving mode when a restriction release condition is satisfied after the execution of the first driving mode is restricted.

(9) In aspect (1), the first driving mode is a mode in which the host vehicle travels following a preceding vehicle, and the restriction of the execution of the first driving mode includes changing to a second driving mode in which a task assigned to an occupant of the host vehicle is heavier than that in the first driving mode.

(10) A vehicle control method according to an aspect of the present invention is a vehicle control method for causing a computer to execute: allowing a recognizer to recognize a surrounding situation of a host vehicle; controlling one or both of steering or acceleration/deceleration of the host vehicle to cause the host vehicle to travel; causing the host vehicle to travel in any of a plurality of driving modes including a first driving mode in which the host vehicle travels so that the speed of the host vehicle reaches a target speed; restricting the execution of at least the first driving mode when a specific object is recognized in a traveling direction of the host vehicle based on map information or a recognition result from the recognizer during the execution of the first driving mode.

(11) A storage medium according to an aspect of the present invention is a computer-readable non-transitory storage medium storing a program for causing a computer to execute: allowing a recognizer to recognize a surrounding situation of a host vehicle; controlling one or both of steering or acceleration/deceleration of the host vehicle to cause the host vehicle to travel; causing the host vehicle to travel in any of a plurality of driving modes including a first driving mode in which the host vehicle travels so that the speed of the host vehicle reaches a target speed; restricting the execution of at least the first driving mode when a specific object is recognized in a traveling direction of the host vehicle based on map information or a recognition result from the recognizer during the execution of the first driving mode.

According to aspects (1) to (11), more appropriate vehicle control can be executed according to the surrounding situation.

BRIEF DESCRIPTION OF THE DRAWINGS

FIG. 2 is a diagram illustrating a functional configuration of a first controller and a second controller.

FIG. 3 is a diagram illustrating an example of a relationship between a driving mode, a control state of a host vehicle M, and a task.

DESCRIPTION OF EMBODIMENTS

Figure 1:
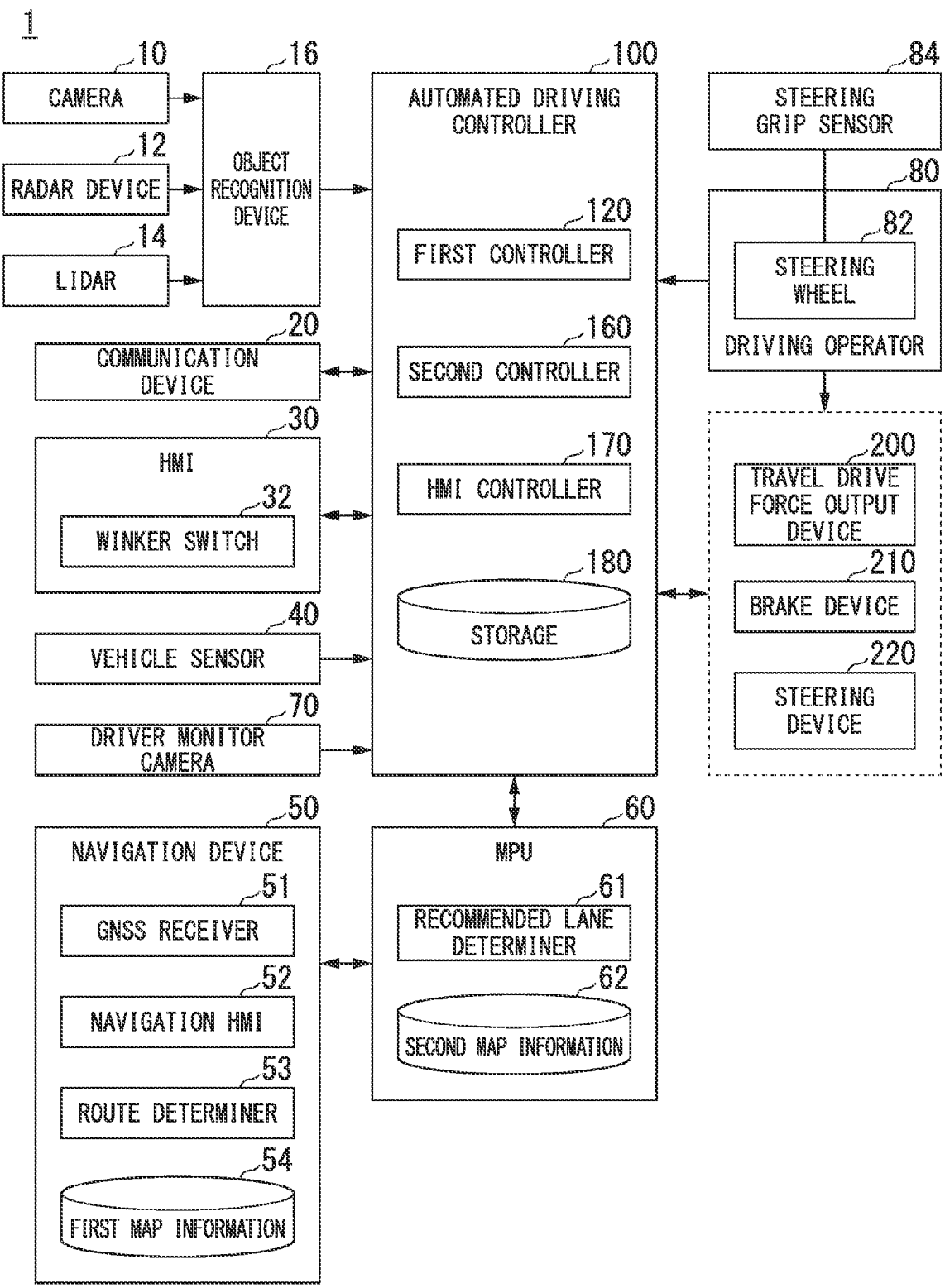
FIG. 1 is a block diagram of a vehicle system using a vehicle control device according to the embodiment.

Hereinafter, embodiments of a vehicle control device, a vehicle control method, and a storage medium of the present invention will be described with reference to the drawings.
[Overall Configuration]
FIG. 1 is a block diagram of a vehicle system 1 using a vehicle control device according to the embodiment. A vehicle in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. An electric motor operates using electric power generated by a generator connected to an internal combustion engine or electric power discharged by secondary batteries or fuel-cell batteries. Hereinafter, as an example, an embodiment in which the vehicle control device is applied to an automated driving vehicle will be described. The automated driving is, for example, automatically controlling one or both of steering or acceleration/deceleration of the vehicle to execute driving control. The vehicle driving control described above may include various driving supports such as adaptive cruise control (ACC) and lane keeping assistance system (LKAS). The driving of the automated driving vehicle may be controlled by the manual driving of the occupant (driver).

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operator 80, an automated driving controller 100, a travel drive force output device 200, a brake device 210, and a steering device 220. These apparatuses and devices are connected to each other by a multiplex communication line such as a controller area network (CAN) communication line, a serial communication line, a wireless communication network, and the like. Moreover, the components illustrated in FIG. 1 are examples only, some components may be omitted and other components may be added. The automated driving controller 100 is an example of a "vehicle control device".

The camera 10 is, for example, a digital camera which uses a solid-state imaging device such as a charge coupled device (CCD) or a complementary metal oxide semiconductor (CMOS). The camera 10 is attached to an arbitrary position of a vehicle (hereinafter referred to as a host vehicle M) in which the vehicle system 1 is mounted. When capturing images on the front side, the camera 10 is attached to an upper part of a front windshield or a back surface of a rear-view mirror. The camera 10, for example, captures the images around the host vehicle M repeatedly and periodically. The camera 10 may be a stereo camera.

The radar device 12 emits radio waves such as millimeter waves to the surroundings of the host vehicle M and detects radio waves (reflected waves) reflected from an object to detect at least the position (the distance and direction) of the object. One or a plurality of radar devices 12 are attached to arbitrary positions of the host vehicle M. The radar device 12 may detect the position and the speed of an object according to a frequency modulated continuous wave (FM-CW) method.

The LIDAR 14 irradiates the periphery of the host vehicle M with light (or an electromagnetic wave having a wavelength close to that of light) and measures the scattered light. The LIDAR 14 detects the distance to an object on the basis of the time taken to receive light after the light was emitted. The radiated light is pulsating laser light, for example. The LIDAR 14 is attached to an arbitrary position on the host vehicle M.

The object recognition device 16 performs sensor fusion processing on detection results obtained by some or all of the camera 10, the radar device 12, and the LIDAR 14 to recognize the position, the kind, the speed, and the like of an object. The object recognition device 16 outputs the recognition results to the automated driving controller 100. The object recognition device 16 may output the detection results obtained by the camera 10, the radar device 12, and the LIDAR 14 to the automated driving controller 100 as they are. The object recognition device 16 may be omitted from the vehicle system 1.

The communication device 20, for example, communicates with other vehicles present around the host vehicle M, or communicates with various server apparatuses via a wireless base station using a cellular network, a Wi-Fi network, Bluetooth (registered trademark), a dedicated short range communication (DSRC), or the like.

The HMI 30 presents various pieces of information to the occupant of the host vehicle M under the control of the HMI controller 170, and accepts input operations by the occupant. The HMI 30 includes, for example, various displays, speakers, microphones, buzzers, touch panels, switches, keys, and the like. The switch includes, for example, a winker switch (direction indicator) 32. The winker switch 32 is provided on, for example, a steering column or a steering wheel. The winker switch 32 is, for example, an example of an operation unit that receives an instruction to change the lane of the host vehicle M by an occupant. For example, when the winker switch 32 is operated in the direction in which the host vehicle M changes lanes, the lighting portion (winker) outside the vehicle associated with the direction in which the host vehicle M changes lanes blinks.

The vehicle sensor 40 includes a vehicle speed sensor that detects the speed of the host vehicle M, an acceleration sensor that detects the acceleration, a yaw-rate sensor that detects the angular velocity around the vertical axis, an azimuth sensor that detects the direction of the host vehicle M, and the like. The vehicle sensor 40 may include a position sensor that detects the position of the host vehicle M. The position sensor is, for example, a sensor that acquires the position information (longitude and latitude information) of the host vehicle M from a global positioning system (GPS) device. The position sensor may be a sensor that acquires the position information of the host vehicle M using the global navigation satellite system (GNSS) receiver 51 of the navigation device 50. The result detected by the vehicle sensor 40 is output to the automated driving controller 100.

The navigation device 50 includes, for example, a GNSS receiver 51, a navigation HMI 52, and a route determiner 53. The navigation device 50 holds the first map information 54 in a storage device such as a hard disk drive (HDD) or a flash memory. The GNSS receiver 51 specifies the position of the host vehicle M on the basis of signals received from GNSS satellites. The position of the host vehicle M may be specified or complemented by an inertial navigation system (INS) which uses the output of the vehicle sensor 40. The navigation HMI 52 includes a display, a speaker, a touch panel, keys, and the like. The navigation HMI 52 may be partially or entirely shared with the HMI 30. For example, the route determiner 53 determines a route (hereinafter a map route) from the position (or an input arbitrary position) of the host vehicle M specified by the GNSS receiver 51 to a destination input by an occupant using the navigation HMI 52 by referring to the first map information 54. The first map information 54 is information in which a road shape is represented by links indicating roads and nodes connected by links. The first map information 54 may include the curvature of a road, point of interest (POI) information, and the like. The first map information 54 may be stored in a storage of the automated driving controller 100, for example. The map route is output to the MPU 60. The navigation device 50 may perform route guidance using the navigation HMI 52 on the basis of the map route. The navigation device 50 may be realized by the functions of a terminal device such as a smartphone or a tablet terminal held by an occupant. The navigation device 50 may transmit a present position and a destination to a navigation server via the communication device 20 and acquire a route equivalent to a map route from the navigation server.

The MPU 60 includes a recommended lane determiner 61, for example, and stores second map information 62 in a storage device such as a HDD or a flash memory. The recommended lane determiner 61 divides the map route provided from the navigation device 50 into a plurality of blocks (for example, the route may be partitioned every 100 [m] in relation to a vehicle traveling direction) and determines a recommended lane for each block by referring to the second map information 62. The recommended lane determiner 61 determines that the vehicle is traveling in a certain lane from the left. When a branching point is present on a map route, the recommended lane determiner 61 determines a recommended lane so that the host vehicle M can travel along a reasonable route for proceeding to a branch destination.

The second map information 62 is more accurate map information than the first map information 54. The second map information 62 includes, for example, information on lane marks such as information on the center of the lane or the boundary of the lane, information on road shoulders and the roadsides, and the like. The second map information 62 may include road information, traffic regulation information, address information (address and postal codes), facility information, telephone number information, information on the installation position of traffic signs and traffic lights, and the like. The second map information 62 may be updated as necessary by the communication device 20 communicating with other devices. The second map information 62 may be stored in the storage of the automated driving controller 100, for example.

The driver monitor camera 70 is, for example, a digital camera that uses a solid-state image sensor such as a CCD or CMOS. The driver monitor camera 70 is attached to, for example, an arbitrary portion of the host vehicle M in a position and direction in which the head of an occupant (hereinafter referred to as a driver) seated in the driver's seat of the host vehicle M can be imaged from the front (in the direction in which the face is imaged). For example, the driver monitor camera 70 is attached to the upper part of the display provided in the central portion of the instrument panel of the host vehicle M.

The driving operator 80 includes, for example, an acceleration pedal, a brake pedal, a shift lever, and other operators in addition to the steering wheel 82. Sensors that detect an amount of operation or the presence of an operation are attached to the driving operator 80, and the detection results are output to a part or all of of the automated driving controller 100 or the travel drive force output device 200, the brake device 210, and the steering device 220. The steering wheel 82 is an example of an "operator that accepts a steering operation by the driver". The operator does not necessarily have to be circular, and may be in the form of a deformed steering wheel, a joystick, a button, or the like. A steering grip sensor 84 is attached to the steering wheel 82. The steering grip sensor 84 is realized by a capacitance sensor or the like, and outputs a signal capable of detecting whether the driver is gripping the steering wheel 82 (meaning that the steering wheel 82 is in contact with force applied thereto) to the automated driving controller 100.

The automated driving controller 100 includes, for example, a first controller 120, a second controller 160, an HMI controller 170, and a storage 180. The first controller 120, the second controller 160, and the HMI controller 170 each are realized when a hardware processor such as a central processing unit (CPU) or the like executes a program (software). Some or all of these components may be realized by hardware (a circuit portion; including circuitry) such as large scale integration (LSI), an application specific integrated circuit (ASIC), a field-programmable gate array (FPGA), or a graphics processing unit (GPU) and may be realized by the cooperation of software and hardware. The program may be stored in advance in a storage device (a non-transitory storage medium) such as a HDD or a flash memory of the automated driving controller 100 and may be stored in a removable storage medium such as a DVD or a CD-ROM and be installed in a HDD or a flash memory of the automated driving controller 100 when a storage medium (a storage device including a non-transitory storage medium) is attached to a drive device. A combination of the action plan generator 140 and the second controller 160 is an example of the "driving controller".

The storage 180 may be realized by the above-mentioned various storage devices, or may be realized by solid state drive (SSD), electrically erasable programmable read only memory (EEPROM), read only memory (ROM), random access memory (RAM), or the like. The storage 180 stores, for example, information necessary for executing the driving control according to the present embodiment, various other information, a program, and the like. The first map information 54 and the second map information 62 described above may be stored in the storage 180.

FIG. 2 is a diagram illustrating a functional configuration of the first controller 120 and the second controller 160. The first controller 120 includes, for example, a recognizer 130, an action plan generator 140, and a mode determiner 150. For example, the first controller 120 realizes the functions of artificial intelligence (AI) and the functions of a predetermined model in parallel. For example, a function of "recognizing an intersection" may be realized by executing recognition of an intersection by deep learning and the like and recognition based on a predetermined condition (signals, lane marks, and the like which can be subjected to pattern matching) in parallel and scoring both recognition results to make comprehensive evaluation. In this way, the reliability of automated driving is secured.

The recognizer 130 recognizes the surrounding situation of the host vehicle M based on the information input from the outside detector (the camera 10, the radar device 12, and the LIDAR 14) via the object recognition device 16. For example, the recognizer 130 recognizes the state such as position, speed, acceleration, and the like of an object around the host vehicle M. The surroundings are, for example, within a predetermined distance based on the position of the host vehicle M. The predetermined distance may be a fixed distance, or may be set based on the sensing performance and accuracy of the outside detector. The object includes other vehicles, people, objects falling on the road, and obstacles such as objects temporarily set due to an accident or construction work. The object position is recognized as the position on an absolute coordinate system in which a representative point (the center, the center of gravity, the center of a driving shaft, or the like) of the host vehicle M is at the origin, for example, and is used for control. The object position may be represented by a representative point such as the center of gravity or a corner of the object and may be represented by a region. The "state" of an object may include the acceleration or a jerk of an object or an "action state" (for example, whether the object has changed or is trying to change lanes).

For example, the recognizer 130 recognizes a lane (a traveling lane) in which the host vehicle M is traveling. For example, the recognizer 130 recognizes the traveling lane by comparing a pattern (for example, an arrangement of solid lines and broken lines) of lane marks obtained from the second map information 62 and a pattern of lane marks around the host vehicle M recognized from the images captured by the camera 10. The recognizer 130 may recognize the traveling lane by recognizing runway boundaries (road boundaries) including lane marks, road shoulders, roadsides, curbs, a median strip, guard rails, and the like without being limited to the lane marks. In this recognition, the position of the host vehicle M acquired from the navigation device 50 and the processing results of the INS may be also taken into consideration. The recognizer 130 recognizes a temporary stop line, an obstacle, a red sign, a toll booth, and other road events. The recognizer 130 recognizes an adjacent lane adjacent to the traveling lane. The adjacent lane is, for example, a lane that can travel in the same direction as the traveling lane.

When recognizing the traveling lane, the recognizer 130 recognizes the position and a direction of the host vehicle M in relation to the traveling lane. For example, the recognizer 130 may recognize an offset from a lane center of a reference point of the host vehicle M and an angle between the traveling direction of the host vehicle M and an extension line of the lane center as the relative position and the direction of the host vehicle M in relation to the traveling lane. Instead of this, the recognizer 130 may recognize the position or the like of the reference point of the host vehicle M in relation to any one of side ends (lane marks or road boundaries) of the traveling lane as the relative position of the host vehicle M in relation to the traveling lane. Here, the reference point of the host vehicle M may be the center of the host vehicle M or the center of gravity. The reference point may be an end (front end, rear end) of the host vehicle M, or may be a position where one of a plurality of wheels included in the host vehicle M is present.

The recognizer 130 may recognize the track area on which the host vehicle M travels. In this case, the recognizer 130 collates, for example, the position of the host vehicle M specified by the navigation device 50, the image captured by the camera 10, the output of the azimuth sensor included in the vehicle sensor 40, and the like with the second map information 62 to recognize on which road and which lane the host vehicle M is traveling on the map. Further, based on the above-mentioned various pieces of information, the recognizer 130 recognize the position (hereinafter, a horizontal position) of the representative point of the host vehicle M in relation to the width direction of the recommended lane and an inclination angle (hereinafter, a yaw angle) of the direction of the host vehicle M at that time with respect to the extension direction of the recommended lane. Then, based on the recognition result, the recognizer 130 recognizes a first track area in which the extension area of the recommended lane obtained from the second map information 62 is applied to the vehicle coordinate system based on the host vehicle M.

By analyzing the image captured by the camera 10, the recognizer 130 recognizes a second track area in which the extension area of the recommended lane is applied to the vehicle coordinate system based on the host vehicle M. For example, the recognizer 130 extracts edge points having a large brightness difference from adjacent pixels in the image, and recognizes the lane marks by connecting the edge points presumed to be on both sides of the recommended lane. Then, the recognizer 130 virtually sets the lane marks in the vehicle coordinate system by converting the position of each point of the lane marks in the image plane into the vehicle coordinate system, and sets the range defined by the lane marks as a second track area.

The recognizer 130 sets a third track area based on the trajectory of a vehicle (preceding vehicle) traveling in front of the host vehicle M in the same lane as the host vehicle M or in the recommended lane. For example, the recognizer 130 recognizes a representative point such as the central portion of the rear end of the preceding vehicle, obtains a trajectory of the representative point on the road, and sets an area expanded by half a general lane width (for example, about 3 to 5 [m]) to the left and right about the trajectory as the third track area.

Then, the recognizer 130 determines a track area to be output to the action plan generator 140 based on a part or all of the first track area, the second track area, and the third track area. For example, the recognizer 130 may determine the track area with priority such as selecting the first track area if the first track area is obtained, selecting the second track area if the first track area is not obtained or its reliability is low, or selecting the third track area if none of the first and second track areas is obtained or its reliability is low. The recognizer 130 may determine the track area by combining any of the first track area, the second track area, and the third track area. This is because the sizes of the first track area, the second track area, and the third track area may not be the same, particularly in the length direction, and a longer track area may be obtained by combining them.

In principle, the action plan generator 140 generates a target trajectory along which the host vehicle M travels in the future automatically (regardless of an operation of a driver) so that the host vehicle M travels in the recommended lane determined by the recommended lane determiner 61 or the track area recognized by the recognizer 130 and it is possible to cope with a surrounding situation of the host vehicle M. The target trajectory includes a speed element, for example. For example, the target trajectory is represented as an arrangement of positions (trajectory points) that the host vehicle M has to reach. The trajectory points are positions that the host vehicle M has to reach every predetermined travel distance (for example, approximately every several [m]) as the distance along a road. In addition to this, a target speed and a target acceleration every predetermined sampling period (for example, approximately every 0.x [sec]) are generated as part of the target trajectory. The trajectory points may be the positions that the host vehicle M has to reach at respective sampling time points of the predetermined sampling periods. In this case, the information of the target speed and the target acceleration is represented by the intervals of the trajectory points.

The action plan generator 140 may set an automated driving event (function) when generating the target trajectory. The automated driving event includes a traffic jam pilot event, a constant speed travel event, a low-speed pilot travel event, a lane change event, a branching event, a merging event, a takeover event, and the like. The action plan generator 140 generates a target trajectory according to the activated event.

The mode determiner 150 determines any one of a plurality of driving modes (in other words, a plurality of modes having different degrees of automation of the driving control of the host vehicle M) in which the driver is assigned with different tasks as the driving mode to be executed by the host vehicle M according to the situation of the host vehicle M. The mode determiner 150 may restrict the execution of the mode or release the execution restriction. The driving controller causes the host vehicle M to travel based on the mode determined by the mode determiner 150. The mode determiner 150 includes, for example, a driver state determiner 152, a specific object determiner 154, and a mode change processor 156. These individual functions will be described later.

FIG. 3 is a diagram illustrating an example of the relationship between the driving mode, the control state of the host vehicle M, and the task. The driving mode of the host vehicle M includes, for example, five modes of mode A to mode E. Among these modes, the degree of automation of the control state, that is, the driving control of the host vehicle M, is highest in mode A, decreasing in the order of mode B, mode C, and mode D, and is lowest in mode E. On the contrary, the task assigned to the driver (occupant) is smallest (mild) in mode A, increasing (becoming heavy) in the order of mode B, mode C, and mode D, and is largest (heavy) in mode E in which manual driving is performed. Mode A is an example of a first driving mode. Modes B to E are examples of a second driving mode. In modes B to E, the control state is not automated driving. Therefore, the automated driving controller 100 is responsible for operations until ending control related to automated driving and shifting to driving support or manual driving. Hereinafter, the contents of each mode will be illustrated.

In mode A, the vehicle is in an automated driving state, and the driver is not assigned with any of the tasks of monitoring the surroundings of the host vehicle M and gripping the steering wheel 82 (hereinafter, referred to as "steering grip"). Whether the driver is monitoring the surroundings is determined based on, for example, the analysis result of the image captured by the driver monitor camera 70, and whether the driver is gripping the steering wheel is determined based on, for example, the detection result of the steering grip sensor 84. The surrounding monitoring includes at least monitoring the front of the host vehicle M (front monitoring in the figure). The front means the space in the traveling direction of the host vehicle M that is visually recognized through the front windshield. However, even in mode A, the driver is required to be in a posture to quickly shift to manual driving in response to a request from the system centered on the automated driving controller 100. The term "automated driving" as used herein means that both the steering and speed of the host vehicle M are controlled without depending on the driver's operation. Mode A is, for example, a mode in which the host vehicle M is caused to travel so that the speed of the host vehicle M becomes the target speed. For example, when a condition that the host vehicle M is traveling at a predetermined speed (for example, about 50 [km/h]) or less on an automobile-only road such as a highway, and a following target preceding vehicle traveling on the same lane as the host vehicle M or a recommended lane is present is satisfied, mode A is a driving mode in which pilot travel of following a preceding vehicle can be executed and may be called a traffic jam pilot mode (TJP mode). The traffic jam pilot mode is an example of the "first driving mode". When this condition is not satisfied, the mode determiner 150 changes the driving mode of the host vehicle M to mode B.

During the execution of mode A, the occupant can perform a second task. The second task is, for example, an action other than the driving of the occupant permitted during the automated driving of the host vehicle M. The second task includes, for example, watching TV, making a mobile phone call, sending/receiving e-mails, eating, and the like.

In mode B, the vehicle is in a driving support state, and the driver is assigned with a task of monitoring the front of the host vehicle M (hereinafter, front monitoring), but is not assigned with gripping the steering wheel 82. For example, in mode B, the lane change of the host vehicle M is performed based on the route setting to the destination by the navigation device 50 and the like according to the determination of the vehicle system 1 without accepting the lane change instruction from the occupant. The lane change is to move the host vehicle M from the host lane (first lane) in which the host vehicle M is traveling to an adjacent lane (second lane) adjacent to the host lane.

In mode C, the vehicle is in a driving support state, and the driver is assigned with a front monitoring task and a task of gripping the steering wheel 82. For example, in mode C, when the vehicle system 1 determines that it is necessary to change the lane of the host vehicle M, an inquiry is made to the occupant via the HMI 30. When an approval for the lane change by the occupant is received from the HMI 30 or the like, driving support of executing the lane change is performed.

Mode D is a driving mode in which a certain degree of driving operation by the driver is required for at least one of steering and acceleration/deceleration of the host vehicle M. For example, in mode D, driving support such as ACC and LKAS is performed. In mode D, when an instruction to change the lane of the host vehicle M by the driver operating the winker switch 32 is received, the driving support of executing the lane change in the instructed direction is performed. The lane change in mode D is an example of a lane change due to the detection of the driver's intention. The lane change in mode D may be performed in mode C. The operation of the winker switch 32 by the driver is an example of a driving operation. The driving operation in mode D may include a driving operation for controlling steering or acceleration/deceleration. The lane change in modes B to D may be an example of a lane change event.

In mode E, the vehicle is in a manual driving state in which the driving operation by the driver is required for steering and acceleration/deceleration of the host vehicle M. In both mode D and mode E, the driver is naturally assigned with a task of monitoring the front of the host vehicle M. The driver is the one who drives the vehicle in modes C to E.

In addition to modes A to E, the plurality of driving modes executed by the host vehicle M include a driving mode (for example, minimum risk maneuver (MRM)) aimed at minimizing the risk associated with the traveling of the host vehicle M. The MRM mode is executed, for example, when the host vehicle M is traveling in the host lane and the lane change to the adjacent lane of the host vehicle M is not started by the section in which the current driving mode of the host vehicle M cannot be continued, or when at least a part of the outside detector (the camera 10, the radar device 12, and the LIDAR 14) of the host vehicle M has an abnormality, or when it is determined that the driver is not suitable for driving based on the analysis result of the image captured by the driver monitor camera 70. In the MRM mode, the host vehicle M is decelerated at least so that the host vehicle M urgently stops at the target position without depending on the operation of the driver. In the MRM mode, steering control of the host vehicle M may be executed as needed. The target position is, for example, a position presumed to be safe for the host vehicle M. The target position may be, for example, the road shoulder of a traveling road, a vacant lot near the road, a parking lot, or the like. If there is no vacant lot or parking lot, the host vehicle may be stopped in the traveling lane. The target position may be acquired, for example, by analyzing the image captured by the camera 10, and a target position within a predetermined distance from the host vehicle M in the traveling direction of the host vehicle M may be acquired by referring to the map information (first map information 54, second map information 62) based on the position information of the host vehicle M.

When the host vehicle M cannot execute the current driving mode, the mode determiner 150 changes the mode to an appropriate mode according to the situation. The mode determiner 150 may acquire the execution state of the task, and change the driving mode of the host vehicle M to a driving mode in which the task is heavier when the task related to the determined driving mode is not executed by the driver.

For example, when the driver is in a posture where he/she cannot shift to manual driving in response to a request from the system during execution of mode A (for example, when he/she continues to look outside the permissible area, or when a sign that driving becomes difficult is detected), the mode determiner 150 causes the HMI controller 170 to use the HMI 30 to execute a control for urging the driver to shift to the manual driving of mode E. When the driver does not respond or it is presumed that the driver does not perform manual driving even after even after a predetermined time has elapsed after the HMI controller 170 is caused to execute the control for urging the shift to manual driving, the mode determiner 150 performs control such that the host vehicle M is stopped at the target position by automated driving in the MRM mode, and the automated driving is stopped (ended) after the stop. After the automated driving is stopped, the host vehicle M is in mode D or E, and the host vehicle M can be started by the manual operation of the driver. Hereinafter, the same applies to "stopping of automated driving".

In mode B, when the driver is not monitoring the front, the mode determiner 150 uses the HMI 30 to urge the driver to monitor the front, and performs control such that the host vehicle M is stopped at the target position and stops automated driving if the driver does not respond. If the driver is not monitoring the front in mode C, or is not gripping the steering wheel 82, the mode determiner 150 uses the HMI 30 to urge the driver to monitor the front and/or grip the steering wheel 82, and performs control such that the host vehicle M is stopped at the target position and stops automated driving if the driver does not respond. In modes C and D, when the lane change is not executed while the host vehicle M reaches a predetermined point, control may be performed such that the host vehicle M is stopped at the target position and the automated driving is stopped.

The driver state determiner 152 determines whether the occupant (driver) is in a state suitable for driving. For example, the driver state determiner 152 monitors the driver's state for changing (switching) the mode, and determines whether the driver's state is in a state corresponding to the task. For example, the driver state determiner 152 analyzes the image captured by the driver monitor camera 70 to perform posture estimation processing, and determines whether the driver is in a posture where he/she cannot shift to manual driving in response to a request from the system. The driver state determiner 152 analyzes the image captured by the driver monitor camera 70 to perform line-of-sight estimation processing and determines whether the driver is monitoring the surrounding (more specifically, the front) of the host vehicle M. When it is determined that the state does not correspond to the task for a predetermined time or more, the driver state determiner 152 determines that the driver is in a state not suitable for driving in the task. When it is determined that the state corresponds to the task, the driver state determiner 152 determines that the driver is in a state suitable for driving in the task. The driver state determiner 152 may determine whether the occupant is in a state where he/she can take turns driving.

The specific object determiner 154 determines whether a specific object is present in the traveling direction (front) of the vehicle M based on the recognition result from the recognizer 130 or the map information. The specific object determiner 154 may make the determination while the host vehicle M is executing a predetermined driving mode. The details of the function of the specific object determiner 154 will be described later.

The mode determiner 150 determines the driving mode of the host vehicle M based on the determination results of the driver state determiner 152 and the specific object determiner 154. The mode change processor 156 performs various processes for switching to the mode determined by the mode determiner 150. For example, the mode change processor 156 instructs a driving support device (not illustrated) to operate, causes the HMI controller 170 to control the HMI 30 in order to urge the driver to perform a predetermined action (task or the like), and instructs the action plan generator 140 to generate a target trajectory for emergency stop based on the action plan generator 140.

The second controller 160 controls the travel drive force output device 200, the brake device 210, and the steering device 220 so that the host vehicle M passes the target trajectory generated by the action plan generator 140 at the scheduled time.

The second controller 160 includes, for example, an acquirer 162, a speed controller 164, and a steering controller 166. The acquirer 162 acquires information on the target trajectory (trajectory points) generated by the action plan generator 140 and stores the information in a memory (not illustrated). The speed controller 164 controls the travel drive force output device 200 or the brake device 210 on the basis of a speed element included in the target trajectory stored in the memory. The steering controller 166 controls the steering device 220 according to the degree of curving of the target trajectory stored in the memory. The processes of the speed controller 164 and the steering controller 166 are realized by a combination of feedforward control and feedback control, for example. As an example, the steering controller 166 executes feedforward control according to the curvature of a road in front of the host vehicle M and feedback control based on an offset from a target trajectory in combination.

The HMI controller 170 notifies the occupants of the host vehicle M of predetermined information by the HMI 30. The predetermined information includes, for example, information on the traveling of the host vehicle M, such as information on the state of the host vehicle M and information on driving control. The information on the state of the host vehicle M includes, for example, the speed, the engine speed, the shift position, and the like of the host vehicle M. The information on driving control includes, for example, an inquiry as to whether to change lanes, whether driving control is executed, information on changing driving control, and information on the status of driving control (for example, the content of an event being executed). The information on the driving control may include, for example, the current driving mode, information on the task assigned to the driver due to switching of the driving mode, information for urging the execution of the task, and the like. The predetermined information may include information that is not related to the traveling control of the host vehicle M, such as contents (for example, a movie) stored in a storage medium such as a television program or a DVD. The predetermined information may include, for example, information on the current position and destination of the host vehicle M, and the remaining amount of fuel.

For example, the HMI controller 170 may generate an image including the above-mentioned predetermined information and display the generated image on the display of the HMI 30. The HMI controller 170 may generate a sound indicating the predetermined information and output the generated sound from the speaker of the HMI 30. The HMI controller 170 may output the information received by the HMI 30 to the communication device 20, the navigation device 50, the first controller 120, and the like.

The travel drive force output device 200 outputs a travel drive force (torque) for a vehicle to travel to driving wheels. The travel drive force output device 200 includes, for example, a combination of an internal combustion engine, an electric motor, and a transmission and an electronic controller (ECU) that controls these components. The ECU controls the above-mentioned components according to the information input from the second controller 160 or the information input from the driving operator 80.

The brake device 210 includes, for example, a brake caliper, a cylinder that delivers hydraulic pressure to the brake caliper, an electric motor that generates hydraulic pressure in the cylinder, and a brake ECU. The brake ECU controls the electric motor according to the information input from the second controller 160 or the information input from the driving operator 80 so that brake torque corresponding to a braking operation is output to each wheel. The brake device 210 may include a backup mechanism that delivers hydraulic pressure generated by an operation of a brake pedal included in the driving operator 80 to a cylinder via a master cylinder. The brake device 210 is not limited to the above-described configuration and may be an electrically-controlled hydraulic-pressure brake device that controls an actuator according to information input from the second controller 160 and delivers hydraulic pressure of the master cylinder to a cylinder.

The steering device 220 includes, for example, a steering ECU and an electric motor. The electric motor, for example, applies a force to a rack-and-pinion mechanism to change the direction of a steering wheel. The steering ECU drives an electric motor according to the information input from the second controller 160 or the information input from the steering wheel 82 of the driving operator 80 to change the direction of the steering wheel.

[Switching Driving Control of Driving Mode Based on Determination Result of Specific Object]

Hereinafter, the details of the function of the specific object determiner 154 will be described. In the following, several control patterns will be described mainly regarding such control that the mode determiner 150 switches the driving mode of the host vehicle M based on a specific object or the like determined by the specific object determiner 154. In the following, it is assumed that the occupant executes the task corresponding to the mode to be switched.

<First Control Pattern>

Figure 4:
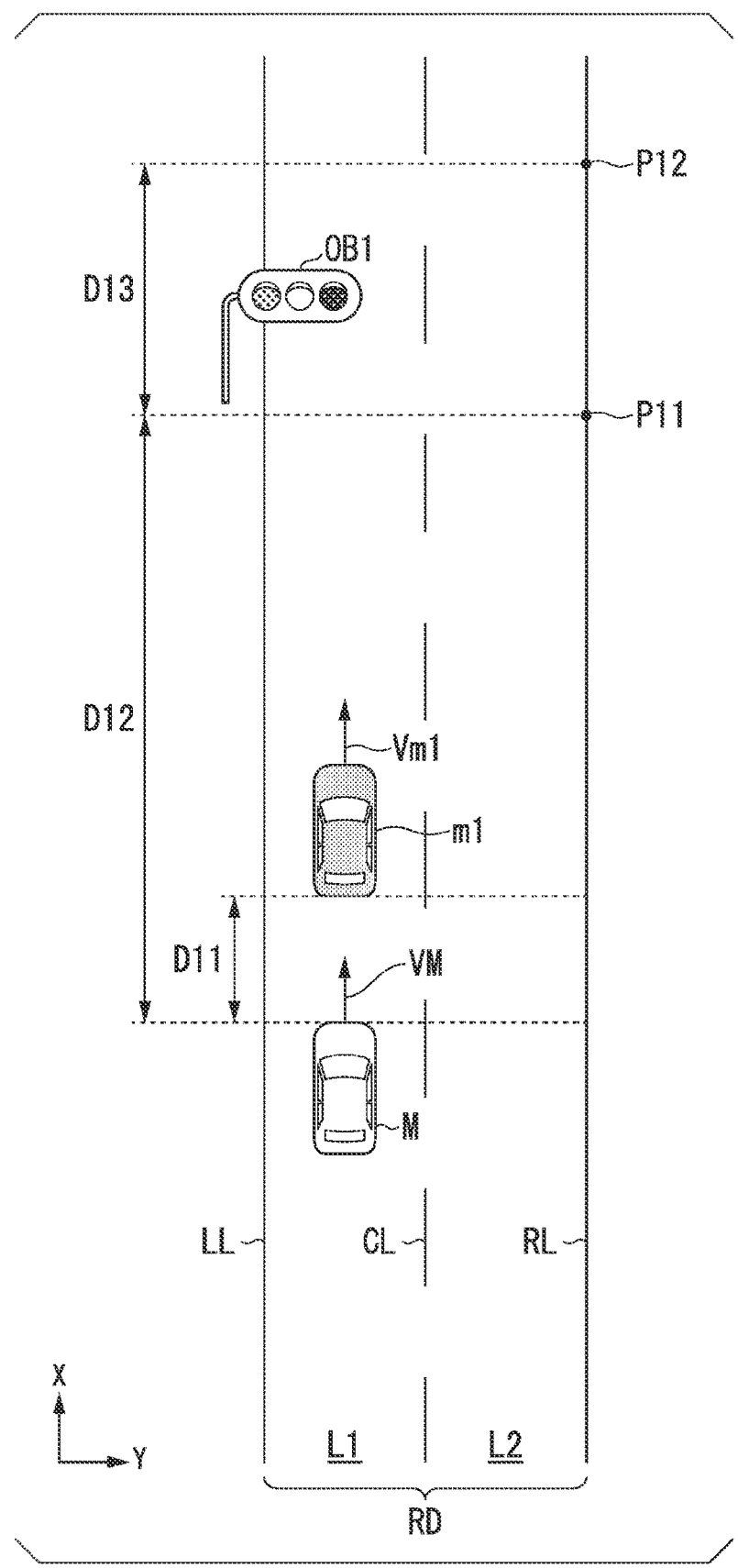
FIG. 4 is a diagram for explaining determination of a specific object and switching of a driving mode in a first control pattern.

FIG. 4 is a diagram for explaining determination of a specific object and switching of a driving mode in a first control pattern. As the first control pattern, a control pattern in which a traffic light is recognized as a specific object in the traveling direction of the host vehicle M is illustrated. In the example of FIG. 4, a road RD having lanes L1 and L2 in which vehicles can travel in the same direction is illustrated. The lanes L1 and L2 are both lanes extending in the X-axis direction. The lane L1 is partitioned by lane marks LL and CL, and the lane L2 is partitioned by lane marks CL and RL. It is assumed that the road RD is, for example, an automobile-only road such as an expressway. Further, in the example of FIG. 4, the host vehicle M and the other vehicle m1 are illustrated, and it is assumed that the host vehicle M travels in the lane L1 at a speed of VM and the other vehicle m1 travels further forward in the same lane L1 as the host vehicle M at a speed of Vm1. Hereinafter, the other vehicle m1 may be referred to as a "preceding vehicle m1." The same applies to the following description of the control pattern.

In the first control pattern, it is assumed that the driving controller has already caused the host vehicle M to travel in the first driving mode (for example, mode A (TJP mode)). In mode A, the driving controller executes control of the speed and steering control of the host vehicle M so that the host vehicle M follows the preceding vehicle m1 while maintaining the distance D11 between the reference point of the host vehicle M and the reference point of the preceding vehicle m1 at a first threshold value Dth1. In the example of FIG. 4, the reference point of the host vehicle M is the front end of the host vehicle M, and the reference point of the preceding vehicle m1 is the rear end of the preceding vehicle m1.

In the first control pattern, the specific object determiner 154 determines whether a traffic light OB1 is present in the traveling direction of the host vehicle M based on the recognition result from the recognizer 130. The traffic light OB1 is an indicator that indicates the permission or refusal of the passage of a vehicle traveling in the lane L1 (which may include the lane L2). The traffic light OB1 notifies the vehicle of an instruction corresponding to a color by, for example, emitting light from one of a plurality of light sources of different colors. For example, the specific object determiner 154 determines whether the traffic light OB1 is present in the traveling direction of the host vehicle M from characteristic information such as the shape and size of an object included in the image based on the analysis result of the image captured by the camera 10. The specific object determiner 154 identifies a road on which the host vehicle M travels by referring to the second map information 62 based on the position information of the host vehicle M obtained from the vehicle sensor 40 or the navigation device 50, and determines whether the traffic light OB1 is present in the traveling direction from the position of the host vehicle M on the identified road. When it is determined that the traffic light OB1 is present, the specific object determiner 154 may acquire the position P11 of the traffic light OB1 and the distance D12 from the position of the host vehicle M. The specific object determiner 154 may determine whether the distance D12 from the position of the host vehicle M to the position P11 of the traffic light OB1 is within the second threshold value Dth2.

The mode determiner 150 restricts execution of mode A of the host vehicle M when the specific object determiner 154 determines that the traffic light OB1 is present and the distance D12 between the host vehicle M and the traffic light OB1 is within the second threshold value Dth2. "Restricting the execution of mode A" means, for example, changing the driving mode from mode A, which is the first driving mode, to mode B, C, D, or E which is the second driving mode in which the task assigned to the occupant is heavier than the first driving mode. "Restricting the execution of mode A" means, in addition to the change, stopping or reducing some of the functions of the mode without changing the current mode. For example, when mode A is restricted, for example, front monitoring and steering grip are not required, but the occupant may be temporarily requested to perform front monitoring and steering grip when the vehicle M passes near the traffic light OB1 to execute temporary driving support.

The mode determiner 150 may release the restriction of the execution of mode A when the restriction release condition is satisfied after the execution of mode A is restricted. The restriction release condition in the first control pattern is, for example, that the host vehicle M has reached a point P12 ahead of (away from the host vehicle M) the position P11 of the traffic light OB1 by a predetermined distance D13.

According to the first control pattern described above, it is possible to switch to a more appropriate mode depending on the presence of the traffic light OB1 on the road RD. For example, although the position of the traffic light OB1 can be found from the map information or the image captured by the camera 10, it is not possible to find what kind of instruction is given by the traffic light OB1 (specifically, passage permission or passage refusal). Therefore, as in the first control pattern, when there is the traffic light OB1 associated with the lane L1 in which the host vehicle M travels, the execution of mode A of the host vehicle M is restricted and the task assigned to the occupant is made heavier than the current situation. In this way, if the host vehicle M is likely to behave differently from the instruction of the traffic light OB1, it can be immediately dealt with by the operation of the occupant.

Figure 5:
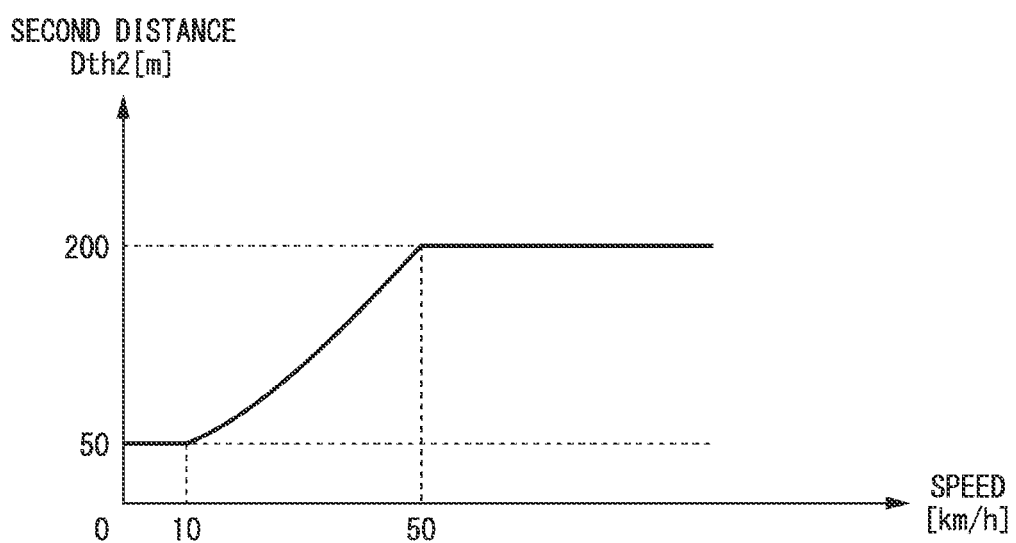
FIG. 5 is a diagram for explaining changing a second threshold value according to the speed.

The specific object determiner 154 may change the value of the second threshold value Dth2 according to the magnitude of the speed VM of the host vehicle M. FIG. 5 is a diagram for explaining changing of the second threshold value Dth2 according to the speed. The horizontal axis in FIG. 5 indicates the speed [km/h] of the host vehicle M, and the vertical axis indicates the second threshold value Dth2 [m] which is a reference for changing the mode. The value illustrated in FIG. 5 is an example, and another value may be used. The same applies to the following description of the figure using the same values.

As illustrated in FIG. 5, when the speed VM of the host vehicle M is, for example, 10 to 50 [km/h], the specific object determiner 154 linearly or non-linearly increases the second threshold value Dth2 [m] as the speed increases. As a result, even if the speed VM is increased, a certain amount of time can be secured before the mode is switched. Therefore, when the task to be assigned to the occupant is switched to a heavy task, the occupant can have enough time to execute the task.

When the speed of the host vehicle M is less than 10 [km/h], the specific object determiner 154 sets the second threshold value Dth2 to a constant value. As a result, the mode is restricted immediately before the traffic light OB1, and it is possible to prevent the occupant from being assigned a heavy task. The specific object determiner 154 may keep the distance Dth2 constant even when the speed of the host vehicle M exceeds 50 [km/h]. As a result, it is possible to prevent the execution of mode A from being restricted from a point away from the traffic light OB1. According to the first control pattern described above, more appropriate driving control can be executed when a traffic light is present in the traveling direction.

<Second Control Pattern>

Figure 6:
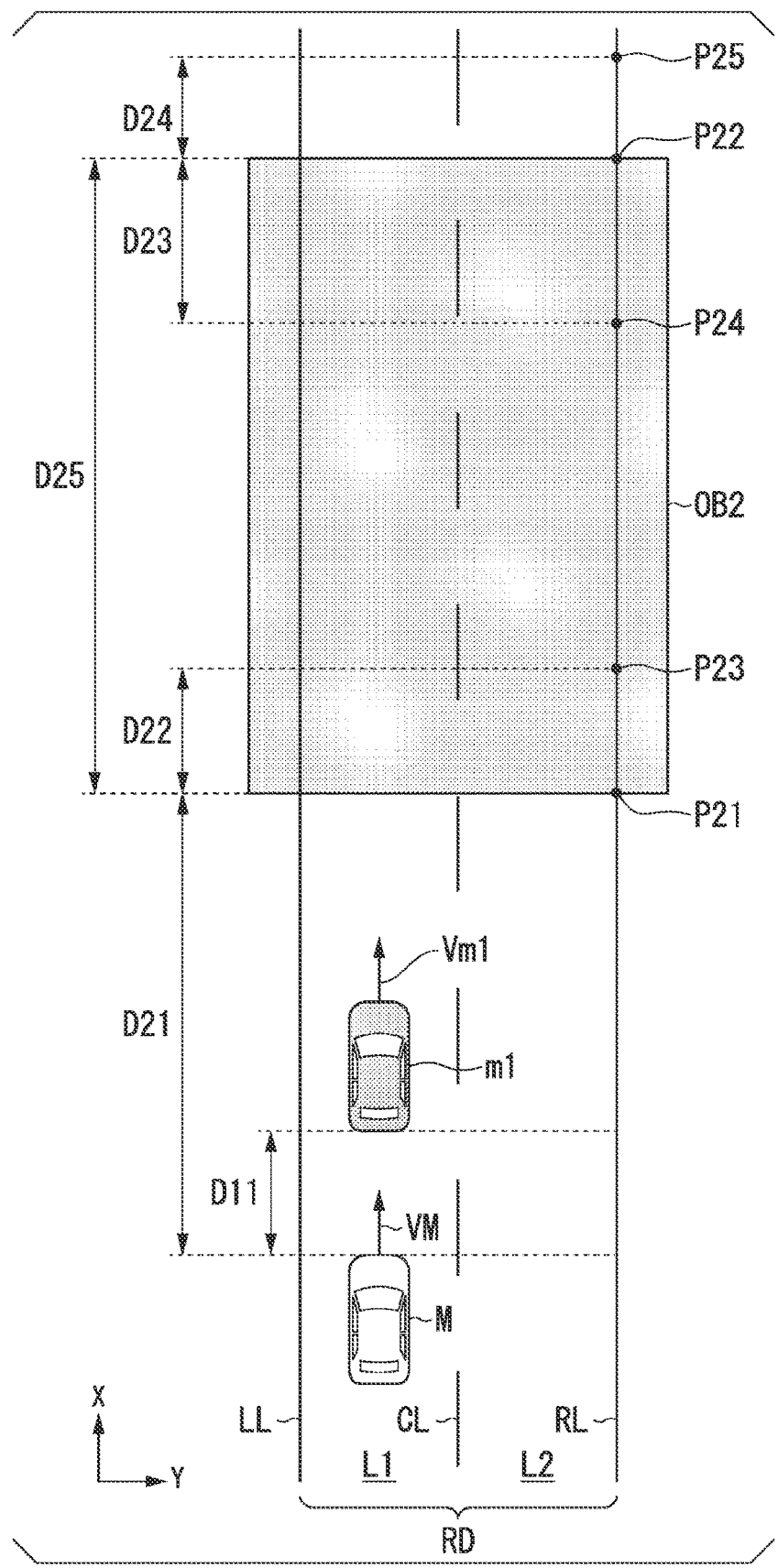
FIG. 6 is a diagram for explaining determination of a specific object and switching of a driving mode in a second control pattern.

Next, a second control pattern will be described. FIG. 6 is a diagram for explaining determination of a specific object and switching of a driving mode in the second control pattern. As the second control pattern, a control pattern in which a tunnel is recognized as a specific object in the traveling direction of the host vehicle M is illustrated. In the example of FIG. 6, it is assumed that the host vehicle M is executing mode A of following the preceding vehicle m1 as in the first control pattern.

In the second control pattern, the specific object determiner 154 determines whether a tunnel OB2 is present in the traveling direction based on the recognition result from the recognizer 130. For example, the specific object determiner 154 determines whether the tunnel OB2 is present in the traveling direction of the host vehicle M from characteristic information such as the shape and size of the object included in the image based on the analysis result of the image captured by the camera 10. The specific object determiner 154 may determine whether the tunnel OB2 is present in the traveling direction of the host vehicle M by referring to the map information based on the position information of the host vehicle M. When the specific object determiner 154 determines that the tunnel OB2 is present, the specific object determiner 154 may acquire the distance D21 from the position of the host vehicle M to the entrance point P21 of the tunnel OB2, and may acquire the position P22 of the exit point P22 of the tunnel OB2.

The mode determiner 150 restricts the execution of mode A of the host vehicle M when the distance D21 between the host vehicle M and the tunnel OB2 is within a third threshold value Dth3. As a result, even if a part of the outside detector of the host vehicle M recognizes an object erroneously due to changes in the surrounding situation before and after traveling in the tunnel OB2, tasks such as front monitoring and steering grip are assigned to the occupant. Thus, the vehicle can travel more safely.

Figure 7:
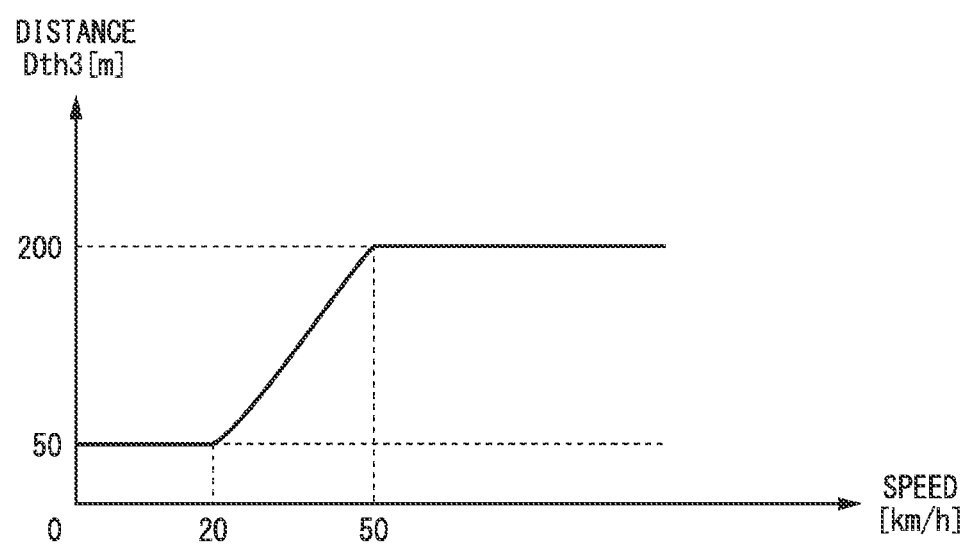
FIG. 7 is a diagram for explaining changing a third threshold value according to the speed.

The specific object determiner 154 may change the third threshold value Dth3 according to the magnitude of the speed VM of the host vehicle M. FIG. 7 is a diagram for explaining changing of the third threshold value Dth3 according to the speed. The horizontal axis in FIG. 7 indicates the speed VM [km/h] of the host vehicle M, and the vertical axis indicates the third threshold value Dth3 [m]. As illustrated in FIG. 7, when the speed VM of the host vehicle M is 20 to 50 [km/h], the specific object determiner 154 linearly or non-linearly increases the third threshold value Dth3 [m] between 50 and 200 [m] as the speed VM increases. As a result, when the task assigned to the occupant by the mode switches to a heavy task, the occupant can have enough time to execute the task.

When the speed of the host vehicle M is less than 20 [km/h], the specific object determiner 154 sets the third threshold value Dth3 to a constant lower limit value (50 [m]). As a result, the mode is restricted immediately before the tunnel OB2, and it is possible to suppress the task from being assigned to the occupant. The specific object determiner 154 may set the third threshold value Dth3 to a constant upper limit value (200 [m]) even when the speed of the host vehicle M exceeds 50 [km/h]. As a result, it is possible to suppress the mode from being restricted from a point away from the tunnel OB2.

The mode determiner 150 may release the restriction of the execution of mode A when the restriction release condition is satisfied after the execution of mode A is restricted. The restriction release condition in the second control pattern is, for example, that the host vehicle M has reached a point P23 ahead of (away from the host vehicle M) the entrance point P21 by a predetermined distance D33.

In the second control pattern, the execution of mode A of the host vehicle M may be restricted based on the exit point P22 instead of (or in addition to) the entrance point P21 of the tunnel OB2. In this case, the mode determiner 150 restricts the execution of mode A when the mode in the tunnel OB2 of the host vehicle M is mode A and the host vehicle M has reached a point P24 which is a predetermined distance D23 ahead of the exit point P22. The mode determiner 150 may release the restriction of the execution of mode A when the restriction release condition is satisfied after restricting the execution of mode A in front of the exit of the tunnel OB2. The restriction release condition in this case is, for example, that the host vehicle M has reached a point P25 which is a predetermined distance D24 ahead of the exit point P22.

The mode determiner 150 may suppress the execution of mode A when the length D23 from the entrance point P21 to the exit point P22 of the tunnel OB2 is within a fourth threshold value Dth4. As a result, it is possible to prevent the driving mode from being frequently restricted every time the host vehicle M passes the tunnel OB2 having a short distance, and it is possible to continue the execution of mode A.

According to the second control pattern described above, more appropriate driving control can be executed when a tunnel is present on the road.

<Third Control Pattern>

Figure 8:
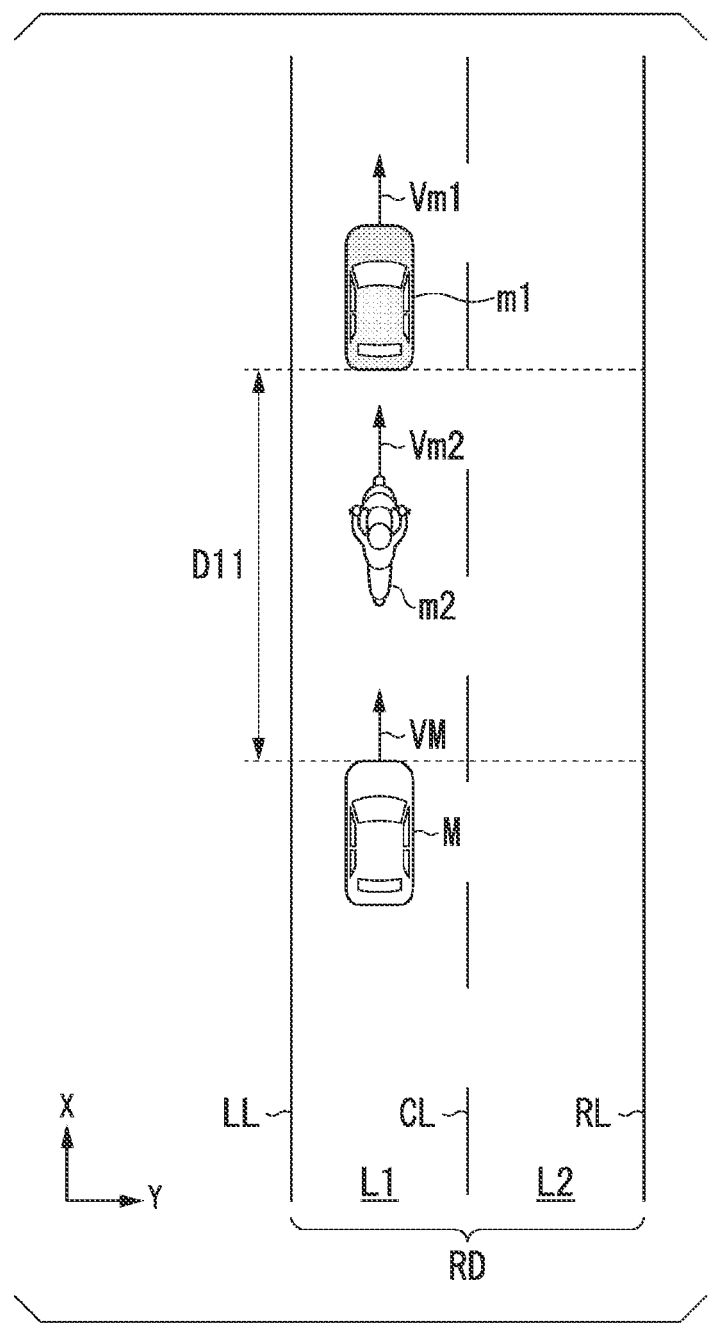
FIG. 8 is a diagram for explaining determination of a specific object and switching of a driving mode in a third control pattern.

Next, a third control pattern will be described. FIG. 8 is a diagram for explaining determination of a specific object and switching of a driving mode in the third control pattern. As the third control pattern, a control pattern in which a two-wheeled vehicle is recognized as a specific object in the traveling direction of the host vehicle M is illustrated. In the example of FIG. 8, a situation in which a two-wheeled vehicle m2 traveling at a speed of Vm2 cuts in between the host vehicle M and the preceding vehicle m1 during execution of mode A in which the host vehicle M follows the preceding vehicle m1 is illustrated.

In this situation, the specific object determiner 154 determines whether the other vehicle m2 traveling in the traveling direction of the host vehicle M is a two-wheeled vehicle among the other vehicles recognized by the recognizer 130. In this case, the specific object determiner 154 determines whether the preceding vehicle m2 is a two-wheeled vehicle from the characteristic information such as the shape and size of the object included in the image based on the analysis result of the image captured by the camera 10. The specific object determiner 154 determines whether the preceding vehicle m2 is a two-wheeled vehicle based on the vehicle type (for example, the vehicle number) shown on the license plate installed on the rear side of the preceding vehicle m2 included in the image.

When the specific object determiner 154 determines that the preceding vehicle m2 is a two-wheeled vehicle, the mode determiner 150 restricts the execution of mode A of the host vehicle M. Normally, when mode A is executed, control is performed such that the host vehicle M follows the preceding vehicle even if the preceding vehicle is a two-wheeled vehicle. However, a two-wheeled vehicle is smaller than a four-wheeled vehicle and can run on a narrow track. Therefore, a four-wheeled vehicle (the host vehicle M) may not be able to travel on a track on which a two-wheeled vehicle can travel. For example, if there is a large obstacle in the traveling lane, a four-wheeled vehicle must enter an adjacent lane even if a two-wheeled vehicle can avoid the obstacle without crossing the traveling lane. Therefore, according to the third control pattern, the execution to mode A is restricted when the preceding vehicle m2 is a two-wheeled vehicle. Thus, more appropriate driving support can be performed.

When the specific object determiner 154 determines that the preceding vehicle m2 is a two-wheeled vehicle and the two-wheeled vehicle is continuously recognized for a predetermined time or longer, the mode determiner 150 may restrict the execution of mode A of the host vehicle M. The predetermined time is, for example, about 3 to 5 [s]. Since a two-wheeled vehicle can easily pass a vehicle in front of it, even if the two-wheeled vehicle cuts in front of the host vehicle M, the two-wheeled vehicle may pass a vehicle (the other vehicle m1 in the figure) further ahead in a short time. When the preceding vehicle m2 passes the other vehicle m1, the pilot travel is executed again regarding the other vehicle m1 as a preceding vehicle. Therefore, even if it is determined that the preceding vehicle is a two-wheeled vehicle, the restriction of the execution of mode A is suppressed until the determination continues for a predetermined time or longer. Thus, more stable driving control can be executed.

The mode determiner 150 may release the restriction of the execution of mode A when the restriction release condition is satisfied after the execution of mode A is restricted. The restriction release condition in the third control pattern is, for example, that the two-wheeled vehicle m2 passes the other vehicle m1 and the like, and the other vehicle m1 becomes the preceding vehicle of the host vehicle M again.

<Fourth Control Pattern>

Figure 9:
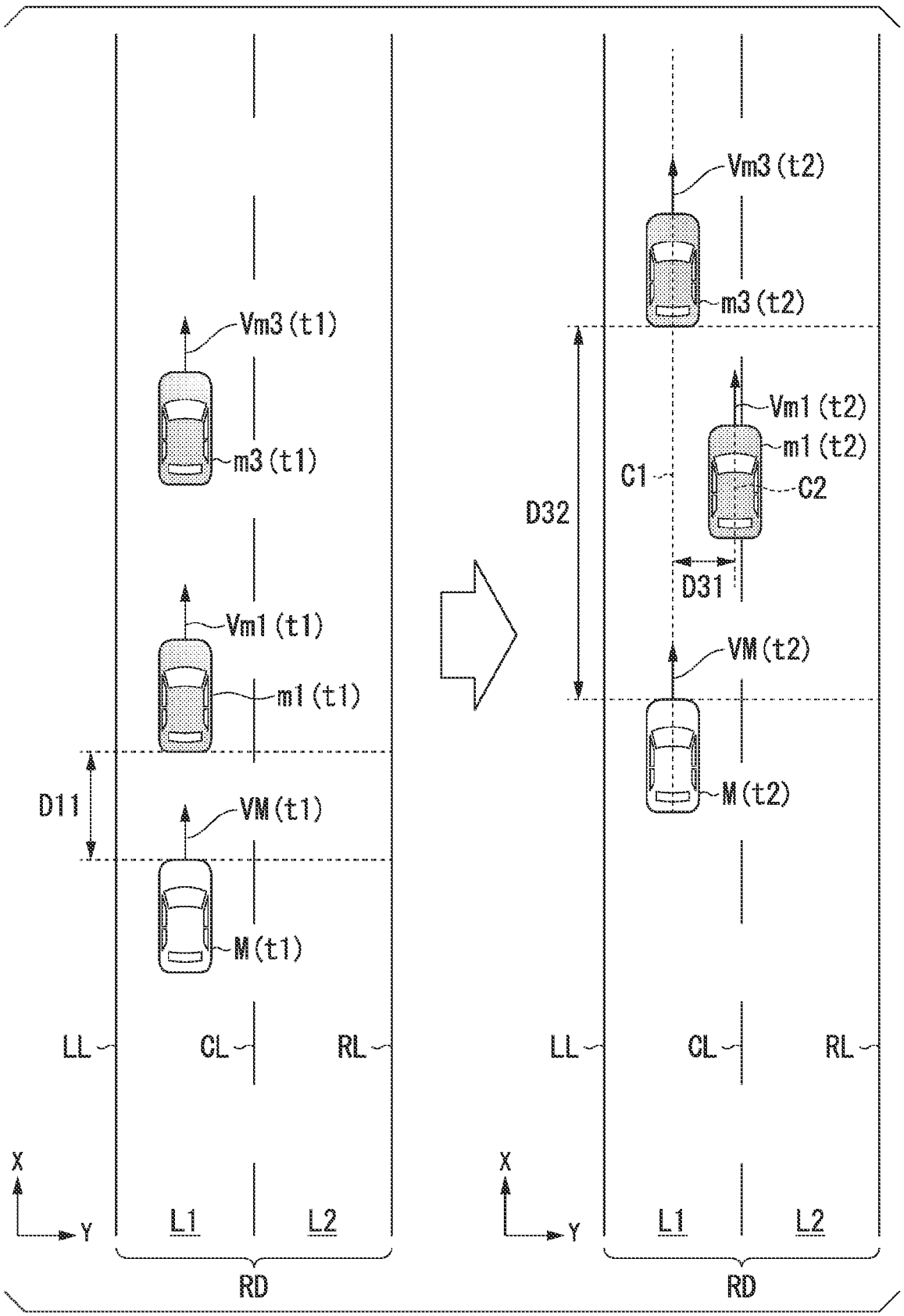
FIG. 9 is a diagram for explaining determination of a specific object and switching of a driving mode in a fourth control pattern.

Next, a fourth control pattern will be described. FIG. 9 is a diagram for explaining determination of a specific object and switching of a driving mode in the fourth control pattern. As the fourth control pattern, a control pattern in which the preceding vehicle m1 that the host vehicle M is following is no longer the following target vehicle because the preceding vehicle m1 has become offset (moved) in the lateral direction (road width direction) of the traveling lane (or has changed its lane to an adjacent lane) is illustrated. In the example of FIG. 9, time t2 is later than time t1. It is assumed that the positions of the host vehicle M and the other vehicles m1 and m3 at time t* are represented by M(t*), m1(t*) and m3(t3), respectively, and the speeds of the host vehicle M and the other vehicles m1 and m3 are represented by VM(t*), Vm1(t*), and Vm3(t3), respectively. At time t1, it is assumed that the host vehicle M(t1) is executing mode A and is following the preceding vehicle m1(t1). It is assumed that the preceding vehicle m1(t1) travels in the lane L1 at a speed of Vm1(t1), and another vehicle (a vehicle in front of the preceding vehicle in relation to the host vehicle M) m3(t1) traveling further ahead of the preceding vehicle m1(t1) travels in the lane L1 at a speed of Vm3(t1).

During the pilot travel at time t1 (during execution of mode A), the recognizer 130 performs recognition processing of the lane marks (white lines) based on the map information and the analysis result of the image captured by the camera 10, acquires the traveling trajectory of the preceding vehicle m1, recognizes the track area of the host vehicle M based on the acquired traveling trajectory, and causes the host vehicle M to travel in the recognized track area.

Here, at time t2, it is assumed that the preceding vehicle m1 is executing the lane change from the lane L1 to the lane L2. The specific object determiner 154 determines whether the preceding vehicle m1(t2) that the host vehicle M has followed is the following target. Specifically, the specific object determiner 154 calculates the distance D31 between the center C1 of the lane L1 in which the host vehicle M is traveling and the center C2 of the preceding vehicle m1(t2), and determines whether the calculated distance D31 is equal to or greater than a fourth threshold value Dth4. The fourth threshold value Dth4 is, for example, about 1 [m]. When the distance D31 is equal to or greater than the fourth threshold value Dth4, the specific object determiner 154 determines that the preceding vehicle m1(t2) is not the following target vehicle because it has become offset (moved) in the lateral direction (road width direction) of the lane L1 (or has changed its lane to the lane L2).

Further, when the specific object determiner 154 determines that the preceding vehicle m1(t2) is not the following target vehicle, the specific object determiner 154 determines whether a preceding vehicle (a vehicle present further ahead of the other vehicle when viewed from the host vehicle) traveling in front of the host vehicle M(t2) is present in the same lane L1 (track area) of the host vehicle M(t2). For example, as illustrated in FIG. 9, when the vehicle m3(t2) in front of the preceding vehicle is recognized, the specific object determiner 154 acquires the distance D32 from the reference point of the host vehicle M(t2) to the reference point of the vehicle m3(t2) in front of the preceding vehicle and determines whether the acquired distance D32 is less than a fifth threshold value Dth5. When it is determined that the distance D32 is less than the fifth threshold value Dth5, the mode determiner 150 causes the host vehicle M(t2) to continue mode A by allowing the host vehicle M to follow the preceding vehicle m3 using the vehicle m3(t2) in front of the preceding vehicle as a new preceding vehicle.

The mode determiner 150 restricts the execution of mode A of the host vehicle M when the distance D32 is not less than the fifth threshold value Dth5 (the distance D32 is equal to or higher than the fifth threshold value Dth5) or when the vehicle in front of the preceding vehicle itself is not present (is not recognized). Further, the mode determiner 150 restricts the execution of mode A of the host vehicle M when the distance D32 is not less than the fifth threshold value Dth5 or when the state in which the vehicle in front of the preceding vehicle is not present continues for a predetermined time or longer.

The mode determiner 150 may release the restriction of the execution of mode A when the restriction release condition is satisfied after the execution of mode A is restricted. The restriction release condition in the fourth control pattern is, for example, that the following target preceding vehicle is recognized within a predetermined time after the execution of mode A is restricted. According to the fourth control pattern described above, more appropriate driving control can be executed according to the surrounding situation of the host vehicle M.

<Fifth Control Pattern>

Figure 10:
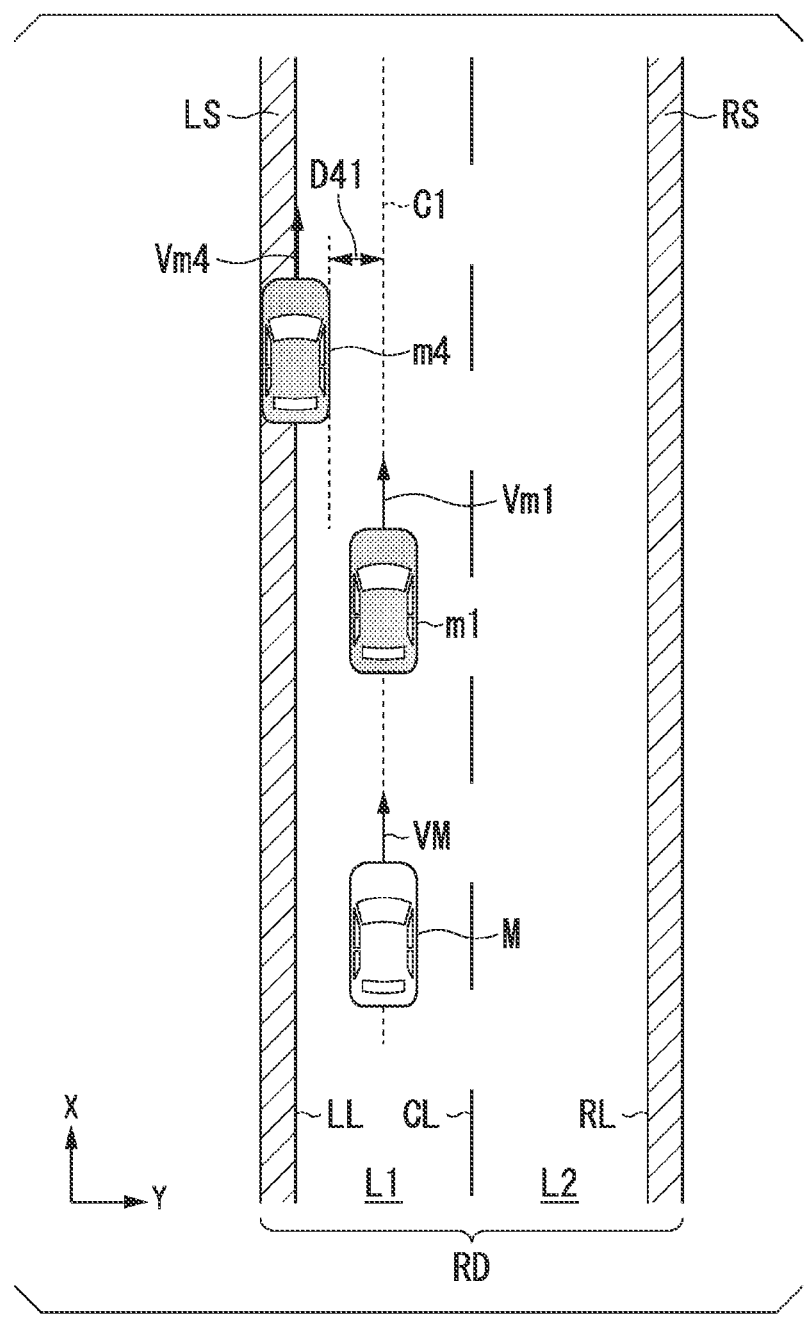
FIG. 10 is a diagram for explaining determination of a specific object and switching of a driving mode in a fifth control pattern.

Next, the fifth control pattern will be described. FIG. 10 is a diagram for explaining determination of a specific object and switching of a driving mode in the fifth control pattern. As the fifth control pattern, a control pattern in which a road shoulder is present in the traveling lane, and another vehicle is present as a specific object on the road shoulder in the traveling direction of the host vehicle M is illustrated. The road shoulder is, for example, a road area provided outside the lane marks LL and RL that partition the lanes L1 and L2 when viewed from the center of the road RD. The road shoulder is formed in a band shape along the extending direction of the road RD. The road shoulder is, for example, an area provided between the roadway and the sidewalk. The road shoulder may be recognized based on map information, for example, or may be acquired by analyzing an image captured by the camera 10. In the example of FIG. 10, the road shoulders LS and RS are present on both the left and right sides of the road RD, and the host vehicle M, the preceding vehicle m1 and the other vehicle m4 are present. The host vehicle M travels following the preceding vehicle m1 according to mode A. It is assumed that the other vehicle m4 is stopped in the area including the road shoulder LS or is traveling at a speed of Vm4. Hereinafter, the other vehicle m4 is referred to as a road shoulder vehicle m4. It is assumed that a part of the vehicle body of the road shoulder vehicle m4 crosses the lane mark LL and is present on the lane L1 side.

In the fifth control pattern, when the road shoulder LS is recognized by the recognizer 130 and the road shoulder vehicle m4 is recognized, it is determined whether the distance D41 between the side end on the lane L1 side of the road shoulder vehicle m4 as a specific object and the center C1 of the lane L1 is less than a sixth threshold value Dth6. The distance D41 may be calculated using the track area recognized by the recognizer 130 instead of the lane L1. When the distance D41 is less than the sixth threshold value Dth6, the mode determiner 150 restricts the execution of mode A of the host vehicle M since there is a high probability that the road shoulder vehicle m4 has an influence on the traveling of the host vehicle M.

The mode determiner 150 may restrict the execution of mode A based on an index value related to vehicles such as THW (Time Headway) or TTC (Time-To Collision). THW is the head time or arrival time, and is calculated by, for example, dividing the distance between the reference point of the preceding vehicle m1 or the road shoulder vehicle m4 and the reference point of the host vehicle M by the speed VM of the host vehicle M. TTC is the contact margin time between the host vehicle M and the road shoulder vehicle m4, and is calculated by, for example, dividing the distance from the reference point of the host vehicle M to the reference point of the road shoulder vehicle m4 by the relative speed of the host vehicle M to the road shoulder vehicle m4. The calculation method is not limited to this. The mode determiner 150 restricts the execution of mode A, for example, when the speed Vm4 of the road shoulder vehicle m4 is less than about 2 [km/h], the THW with the other vehicle M is less than 1.5 [s], and the TTC of the host vehicle M and the road shoulder vehicle m4 is greater than 1 [s] and less than 8 [s].

The mode determiner 150 may restrict the execution of mode A when the distance D41 is less than the distance obtained by linearly interpolating the sixth threshold value Dth6 and the seventh threshold value Dth7 according to the vehicle speed of the road shoulder vehicle m4, the speed Vm4 of the road shoulder vehicle m4 is 2 [km/h] or more and less than 5 [km/h], the THW with the preceding vehicle m1 is less than 1.5 [s], and the TTC between the host vehicle M and the road shoulder vehicle m4 is larger than 1 [s] and less than 8 [s].

The mode determiner 150 may restrict the execution of mode A when the distance D41 is less than the seventh threshold value Dth7, the speed Vm4 of the road shoulder vehicle m4 is 5 [km/h] or more, the THW between the preceding vehicle m1 and the road shoulder vehicle m4 is less than 1.5 [s], and the TTC between the host vehicle M and the road shoulder vehicle m4 is larger than 1 [s] and less than 8 [s].

Figure 11:
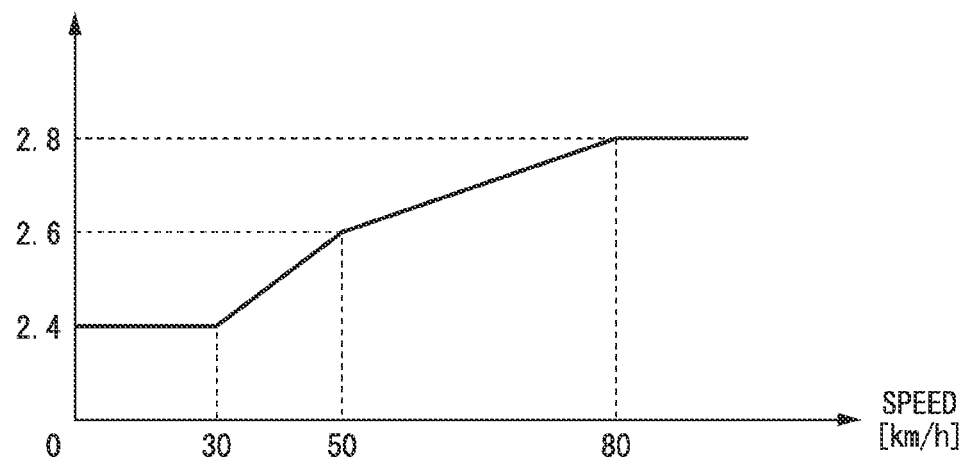
FIG. 11 is a diagram for explaining a sixth threshold value.

Here, one or both of the sixth threshold value Dth6 and the seventh threshold value Dth7 may be a fixed value, or may be adjusted according to the speed of the host vehicle M. FIG. 11 is a diagram for explaining the sixth threshold value Dth6. The horizontal axis in FIG. 11 illustrates the speed of the host vehicle M, and the vertical axis illustrates the sixth threshold value Dth6 [m]. In the example of FIG. 11, a lower limit value and an upper limit value are set for the sixth threshold value Dth6, the sixth threshold value Dth6 is fixed to a lower limit value (2.4 [m] in the figure) when the speed VM of the host vehicle M is a predetermined low speed (30 [km/h] in the figure) or less, and the sixth threshold value Dth6 is fixed to an upper limit value (2.8 [m] in the figure) when the speed VM of the host vehicle M is a predetermined high speed (80 [km/h] in the figure) or higher. In the example of FIG. 11, the threshold value is increased according to the speed at a speed between low speed and high speed. The degree of increase may be changed according to a predetermined speed range. In the example of FIG. 11, the degree of increase when the speed VM of the host vehicle M is in the speed range of 30 to 50 [km/h] is larger than that in the speed range of 50 to 80 [km/h]. The sixth threshold value Dth6 may increase linearly or non-linearly according to the speed.

Figure 12:
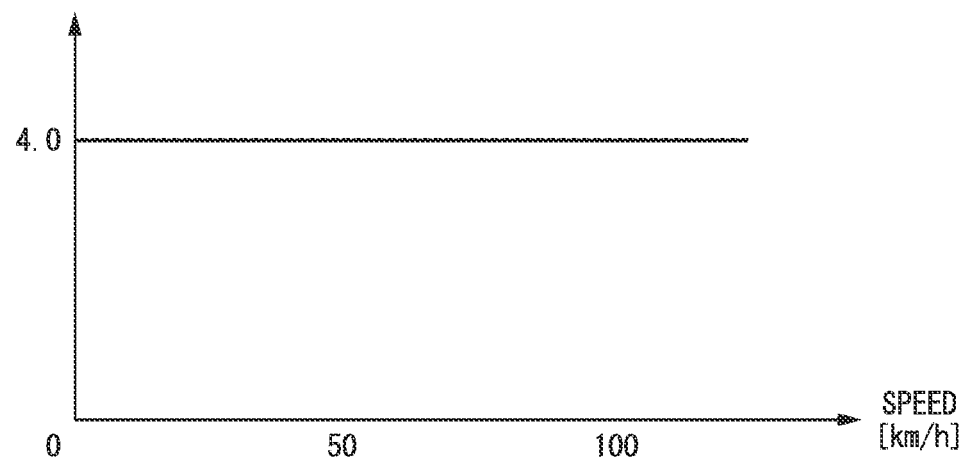
FIG. 12 is a diagram for explaining a seventh threshold value.

FIG. 12 is a diagram for explaining the seventh threshold value Dth7. The horizontal axis in FIG. 12 illustrates the speed of the host vehicle M, and the vertical axis illustrates the seventh threshold value Dth7 [m]. In the example of FIG. 12, the seventh threshold value Dth7 is set to a fixed value (4.0 [m] in the figure) regardless of the speed of the host vehicle M.

The mode determiner 150 may release the restriction of the execution of mode A when the restriction release condition is satisfied after the execution of mode A is restricted. The restriction release condition in the fifth control pattern is, for example, that the host vehicle M has passed the side of the road shoulder vehicle m4. In the fifth control pattern, when a road shoulder vehicle is present on the road shoulder RS in which the host vehicle M is not traveling, the execution of mode A of the host vehicle M is not restricted. According to the fifth control pattern described above, when a road shoulder vehicle is present, the driving mode is restricted. Thus, it is possible to execute more appropriate driving control without following the road shoulder vehicle.

<Sixth Control Pattern>

Figure 13:
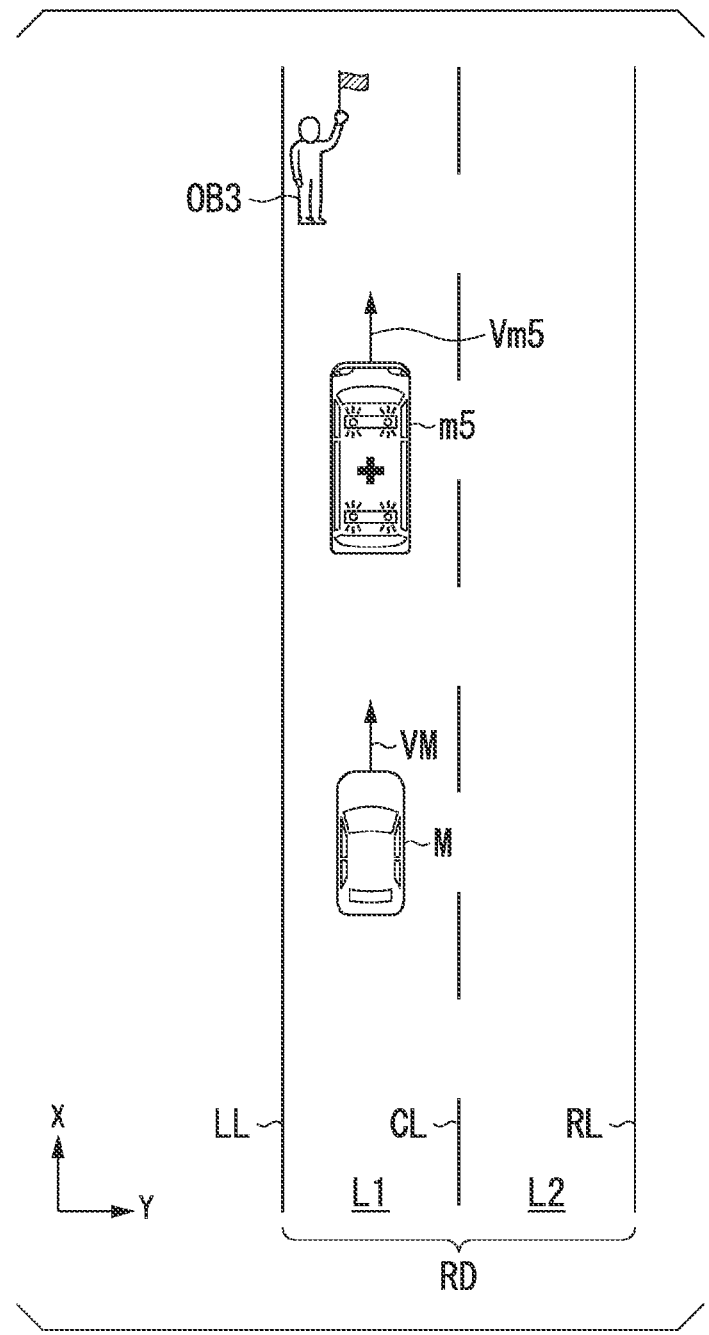
FIG. 13 is a diagram for explaining determination of a specific object and switching of a driving mode in a sixth control pattern.

Next, the sixth control pattern will be described. FIG. 13 is a diagram for explaining determination of a specific object and switching of a driving mode in the sixth control pattern. As the sixth control pattern, a control pattern in which recognizing a specific vehicle such as an emergency vehicle, a firefighting vehicle, or a police vehicle as a specific object, a person (worker or the like) present on a traveling lane, or a specific obstacle such as a road cone, a pole, or a road closed fence indicating a lane blockage due to a traffic accident or construction is illustrated. In the example of FIG. 13, it is assumed that a emergency vehicle m5 as an example of a specific vehicle is traveling in front of the host vehicle M traveling in the lane L1 at a speed of Vm5. In FIG. 13, it is assumed that a worker OB3 who holds a flag and performs traffic control or the like is present in the traveling direction of the host vehicle M in the traveling lane L1.

In the sixth control pattern, when the host vehicle M is executing mode A, the specific object determiner 154 determines whether a specific vehicle or a specific obstacle as a specific object is recognized in the traveling direction of the host vehicle M on the basis of the recognition result from the recognizer 130. For example, the specific object determiner 154 determines whether a specific vehicle or a specific obstacle is present in the traveling direction of the host vehicle M based on the characteristic information such as the shape, size, and color of the object obtained as the analysis result of the image captured by the camera 10. In the example of FIG. 13, it is determined that the emergency vehicle m5 and the worker OB3 are present in the traveling direction of the host vehicle M.

The mode determiner 150 control execution of mode A when the host vehicle M is executing mode A and the specific object determiner 154 determines (recognizes) that a specific vehicle or a specific obstacle is present. In the example of FIG. 13, since the specific object determiner 154 determines that the emergency vehicle m5 and the worker OB3 are present, the mode determiner 150 restricts the execution of mode A of the host vehicle M.

The mode determiner 150 may release the restriction of the execution of mode A when the restriction release condition is satisfied after the execution of mode A is restricted. The restriction release condition in the sixth control pattern is, for example, that the preceding vehicle of the host vehicle M is no longer a specific vehicle, the host vehicle M has passed a specific obstacle, and the like. According to the sixth control pattern described above, when a specific vehicle or a specific obstacle is present in the traveling direction, the execution of mode A of the host vehicle M is restricted. Thus, even when the road situation is different from the usual situation due to the influence of a traffic accident, construction, or the like, more appropriate driving control can be executed.

Each of the first to sixth control patterns described above may be a combination of a part or all of the other control patterns. When a predetermined condition for restricting the execution of the modes illustrated in the first to sixth control patterns is satisfied, the mode determiner 150 may restrict another mode in addition to restricting the execution of mode A. In this case, the mode determiner 150 restricts the execution of at least mode A. The mode determiner 150 may restrict the execution of mode B, for example, when the host vehicle M is executing mode B and the predetermined conditions illustrated in the first to sixth control patterns are satisfied. When restricting the execution of mode B, a mode in which the task assigned to the occupant is heavier than that of mode B is executed.

[Processing Flow]

Figure 14:
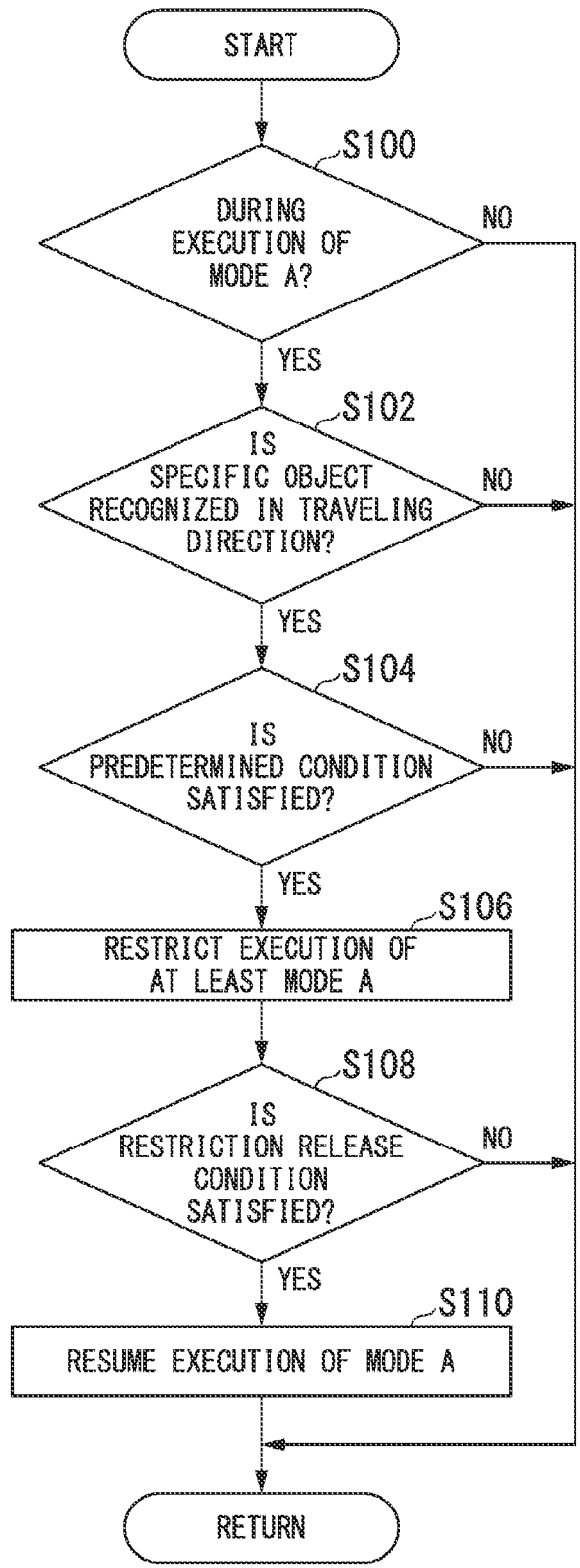
FIG. 14 is a flowchart illustrating an example of the flow of processing executed by an automated driving controller of the embodiment.

FIG. 14 is a flowchart illustrating an example of the flow of processing executed by the automated driving controller 100 of the embodiment. In the example of FIG. 14, among the processes executed by the automated driving controller 100, mainly the processes when the host vehicle M is executing the specific mode (first mode) and the specific object is determined will be mainly described. The process illustrated in FIG. 14 may be repeatedly executed at a predetermined timing or at a predetermined cycle, for example, during the execution of automated driving or driving support.

In the example of FIG. 14, the specific object determiner 154 determines whether the current driving mode of the host vehicle M is mode A (step S100). In the process of step S100, the driving mode may include, in addition to mode A, another mode (mode B) in which the task assigned to the occupant is mild. Next, the specific object determiner 154 determines whether the specific object is recognized in the traveling direction of the host vehicle M (step S102). When it is determined that the specific object is recognized in the traveling direction, the specific object determiner 154 determines whether a predetermined condition is satisfied in the relationship between the specific object and the host vehicle M (step S104). The predetermined condition is, for example, a condition for restricting the execution of mode A illustrated in the first to sixth control patterns described above. When it is determined that the predetermined condition is satisfied, the mode determiner 150 restricts the execution of at least mode A (step S106). In the process of step S106, the mode determiner 150 changes, for example, the driving mode of the host vehicle M from the first driving mode (mode A) to the second driving mode (any of modes B to E).

Next, the mode determiner 150 determines whether the situation of the host vehicle M satisfies the restriction release condition (step S108). The restriction release condition is, for example, that the host vehicle M is following the preceding vehicle and that the host vehicle M is traveling at a predetermined speed or less. When it is determined that the restriction release condition is satisfied, the mode determiner 150 resumes the execution of mode A (step S110). In the process of step S110, when the restriction release condition is satisfied, the mode determiner 150 restarts the traveling of the host vehicle M from the second driving mode to the first driving mode, for example. In this way, the processing of this flowchart ends. The processing of this flowchart ends when it is determined in the process of step S100 that mode A is not being executed, when it is determined in the process of step S102 that the specific object is not recognized in the traveling direction, when it is determined in the process of step S104 that the predetermined condition is not satisfied, or when it is determined in the process of step S108 that the restriction release condition is not satisfied.

According to the above-described embodiment, the vehicle control device includes: the recognizer 130 that recognizes a surrounding situation of the host vehicle M; and a driving controller (the action plan generator 140, the second controller 160) that controls one or both of the steering or acceleration/deceleration of the host vehicle M to cause the host vehicle to travel, wherein the driving controller causes the host vehicle M to travel in any one of a plurality of driving modes including a first driving mode in which the host vehicle travels so that the speed of the host vehicle M reaches a target speed, and when a specific object is recognized in the traveling direction of the host vehicle on the basis of map information or a recognition result from the recognizer 130 during execution of the first driving mode, the driving controller restricts the execution of at least the first driving mode. Thus, more appropriate vehicle control can be executed according to the surrounding situation.

Specifically, according to the above-described embodiment, for example, the execution of the TJP mode is restricted when a specific object is recognized during the execution of the TJP mode by the host vehicle M. In this way, tasks can be assigned to the occupant according to a surrounding situation which cannot be determined by the map information only, and more appropriate driving control can be executed according to the surrounding situation.

The above-described embodiments may be expressed as follows.

An automated driving controller including: a storage device that stores a program; and a hardware processor, wherein the hardware processor executes the program stored in the storage device to execute: allowing a recognizer to recognize a surrounding situation of a host vehicle; controlling one or both of steering or acceleration/deceleration of the host vehicle to cause the host vehicle to travel; causing the host vehicle to travel in any of a plurality of driving modes including a first driving mode in which the host vehicle travels so that the speed of the host vehicle reaches a target speed; restricting the execution of at least the first driving mode when a specific object is recognized in a traveling direction of the host vehicle based on map information or a recognition result from the recognizer during the execution of the first driving mode.

While aspects for carrying out the present invention have been described using embodiments, the present invention is not limited to these embodiments, and various changes and substitutions can be made without departing from the spirit of the present invention.

What is claimed is:

1. A vehicle control device comprising:
  a processor that executes instructions to:
    recognize a surrounding situation of a host vehicle; and control one or both of steering or acceleration/deceleration of the host vehicle to cause the host vehicle to travel, wherein the processor causes the host vehicle to travel in any of a plurality of driving modes including a first driving mode in which the host vehicle travels so that a speed of the host vehicle reaches a target speed, the processor restricts the execution of the first driving mode in response to recognizing a road shoulder of a lane in which the host vehicle travels during the execution of the first driving mode, recognizing a first other vehicle on the road shoulder and a second other vehicle traveling in front of the host vehicle, determining that a distance from a center of a traveling lane of the host vehicle to a side edge of the first other vehicle is less than a threshold value adjusted for a speed of the first other vehicle, determining that the speed of the first other vehicle is in a first predetermined speed range, determining that a headway time between the host vehicle and the second other vehicle is less than a predetermined time, and determining that a contact margin time between the host vehicle and the first other vehicle is in a predetermined time range, the threshold value varies with the speed of the host vehicle between an upper limit and a lower limit, and a degree of increase of the threshold value is changed according to a second predetermined speed range, the processor further restricts execution of the first driving mode in response to recognizing a specific object in a traveling direction of the host vehicle based on map information or a recognition result during the execution of the first driving mode, the specific object comprising at least one of an emergency vehicle, a firefighting vehicle, or a police vehicle, and the threshold value increases as the speed of the host vehicle increases by the second predetermined speed range between the lower limit and the upper limit, and a first range of the second predetermined speed range has a greater degree of increase than a second range of the second predetermined speed range, where the speed is greater than the first range.

2. The vehicle control device according to claim 1, wherein the specific object further comprises a traffic light within a predetermined distance from the host vehicle on a road on which the host vehicle travels.

3. The vehicle control device according to claim 1, wherein the specific object further comprises a tunnel within a predetermined distance from the host vehicle.

4. The vehicle control device according to claim 1, wherein the processor further restricts the execution of the first driving mode in response to determining that the second other vehicle is no longer present in front of the host vehicle during the execution of the first driving mode, and in response to determining that a distance from the host vehicle to a vehicle traveling ahead of the second other vehicle is equal to or greater than a predetermined distance, or in response to determining that there is no vehicle in front of the second other vehicle.

5. The vehicle control device according to claim 1, wherein the processor releases restriction of the execution of the first driving mode in response to determining that a restriction release condition is satisfied after the execution of the first driving mode is restricted.

6. The vehicle control device according to claim 1, wherein restriction of the execution of the first driving mode comprises changing to a second driving mode in which a task assigned to an occupant of the host vehicle is heavier than that in the first driving mode.

7. A vehicle control method for causing a computer to execute:
  recognizing a surrounding situation of a host vehicle;
  controlling one or both of steering or acceleration/deceleration of the host vehicle to cause the host vehicle to travel;
  causing the host vehicle to travel in any of a plurality of driving modes including a first driving mode in which the host vehicle travels so that a speed of the host vehicle reaches a target speed;
  restricting execution of the first driving mode in response to recognizing a road shoulder of a lane in which the host vehicle travels during the execution of the first driving mode, recognizing a first other vehicle on the road shoulder and a second other vehicle traveling in front of the host vehicle, determining that a distance from a center of a traveling lane of the host vehicle to a side edge of the first other vehicle is less than a threshold value adjusted for a speed of the first other vehicle, determining that the speed of the first other vehicle is in a first predetermined speed range, determining that a headway time between the host vehicle and the second other vehicle is less than a predetermined time, and determining that a contact margin time between the host vehicle and the first other vehicle is in a predetermined time range, wherein the threshold value varies with the speed of the host vehicle between an upper limit and a lower limit, and a degree of increase of the threshold value is changed according to a second predetermined speed range; and
  further restricting the execution of the first driving mode in response to recognizing a specific object in a traveling direction of the host vehicle based on map information or a recognition result during the execution of the first driving mode, wherein the specific object is at least one of an emergency vehicle, a firefighting vehicle, or a police vehicle,
  wherein the threshold value increases as the speed of the host vehicle increases by the second predetermined speed range between the lower limit and the upper limit, and a first range of the second predetermined speed range has a greater degree of increase than a second range of the second predetermined speed range, where the speed is greater than the first range.

8. A computer-readable non-transitory storage medium storing a program for causing a computer to execute:
  recognizing a surrounding situation of a host vehicle;
  controlling one or both of steering or acceleration/deceleration of the host vehicle to cause the host vehicle to travel;
  causing the host vehicle to travel in any of a plurality of driving modes including a first driving mode in which the host vehicle travels so that a speed of the host vehicle reaches a target speed;
  restricting execution of the first driving mode in response to recognizing a road shoulder of a lane in which the host vehicle travels during the execution of the first driving mode, recognizing a first other vehicle on the road shoulder and a second other vehicle traveling in front of the host vehicle, determining that a distance from a center of a traveling lane of the host vehicle to a side edge of the first other vehicle is less than a threshold value adjusted for a speed of the first other vehicle, determining that the speed of the first other vehicle is in a first predetermined speed range, determining that a headway time between the host vehicle and the second other vehicle is less than a predetermined time, and determining that a contact margin time between the host vehicle and the first other vehicle is in a predetermined time range, wherein the threshold value varies with the speed of the host vehicle between an upper limit and a lower limit, and a degree of increase of the threshold value is changed according to a second predetermined speed range; and further restricting the execution of at least the first driving mode in response to recognizing a specific object in a traveling direction of the host vehicle based on map information or a recognition result during the execution of the first driving mode, wherein the specific object is an emergency vehicle, a firefighting vehicle, or a police vehicle, wherein the threshold value increases as the speed of the host vehicle increases by the second predetermined speed range between the lower limit and the upper limit, and a first range of the second predetermined speed range has a greater degree of increase than a second range of the second predetermined speed range, where the speed is greater than the first range.

* * * * *